(12) United States Patent
Kamitani

(10) Patent No.: US 6,359,712 B1
(45) Date of Patent: Mar. 19, 2002

(54) BIDIRECTIONAL OPTICAL COMMUNICATION APPARATUS AND OPTICAL REMOTE CONTROL APPARATUS

(75) Inventor: Kenji Kamitani, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/255,724

(22) Filed: Feb. 23, 1999

(30) Foreign Application Priority Data

Feb. 23, 1998 (JP) ............................................ 10-040694

(51) Int. Cl.⁷ .............................................. H04B 10/00
(52) U.S. Cl. ....................... 359/152; 359/156; 359/142; 359/143
(58) Field of Search ................................ 359/152, 156, 359/142, 143

(56) References Cited

U.S. PATENT DOCUMENTS 4,943,782 A  *  7/1990 Stephens et al. .............. 330/4.3
5,822,099 A  *  10/1998 Takamatsu ................... 359/153
6,292,283 B1 * 9/2001 Grandbois ................... 359/143

FOREIGN PATENT DOCUMENTS

| JP | H8-294184 | 11/1996 |
| JP | H9-321704 | 12/1997 |
| JP | H10-190572 | 7/1998 |
| JP | H10-190581 | 7/1998 |

* cited by examiner

*Primary Examiner*—Leslie Pascal
*Assistant Examiner*—David C. Payne
(74) *Attorney, Agent, or Firm*—Lowe Hauptman Gilman & Berner, LLP

(57) ABSTRACT

A bidirectional optical communication apparatus is composed of a set of a first device (1) and a second device (2). Using linear-polarization plates (11A, 11B, 21A, and 21B) and quarter wavelength plates (31A, 31B, 41A, and 41B), a transmission section (TX1) of the first device (1) radiates a first signal (Ls1) consisting of circular polarization in one of the rotational directions, while a reception section (RX2) of the second device (2) receives only these circular polarization components. In addition, a transmission section (TX2) of the second device (2) radiates a second signal (Ls2) consisting of circular polarization in the other rotational direction, while a reception section (RX1) of the first device (1) receives only these circular polarization components. This configuration enables bidirectional optical communication without complicated communication control and accurate optical-axis alignment.

10 Claims, 19 Drawing Sheets

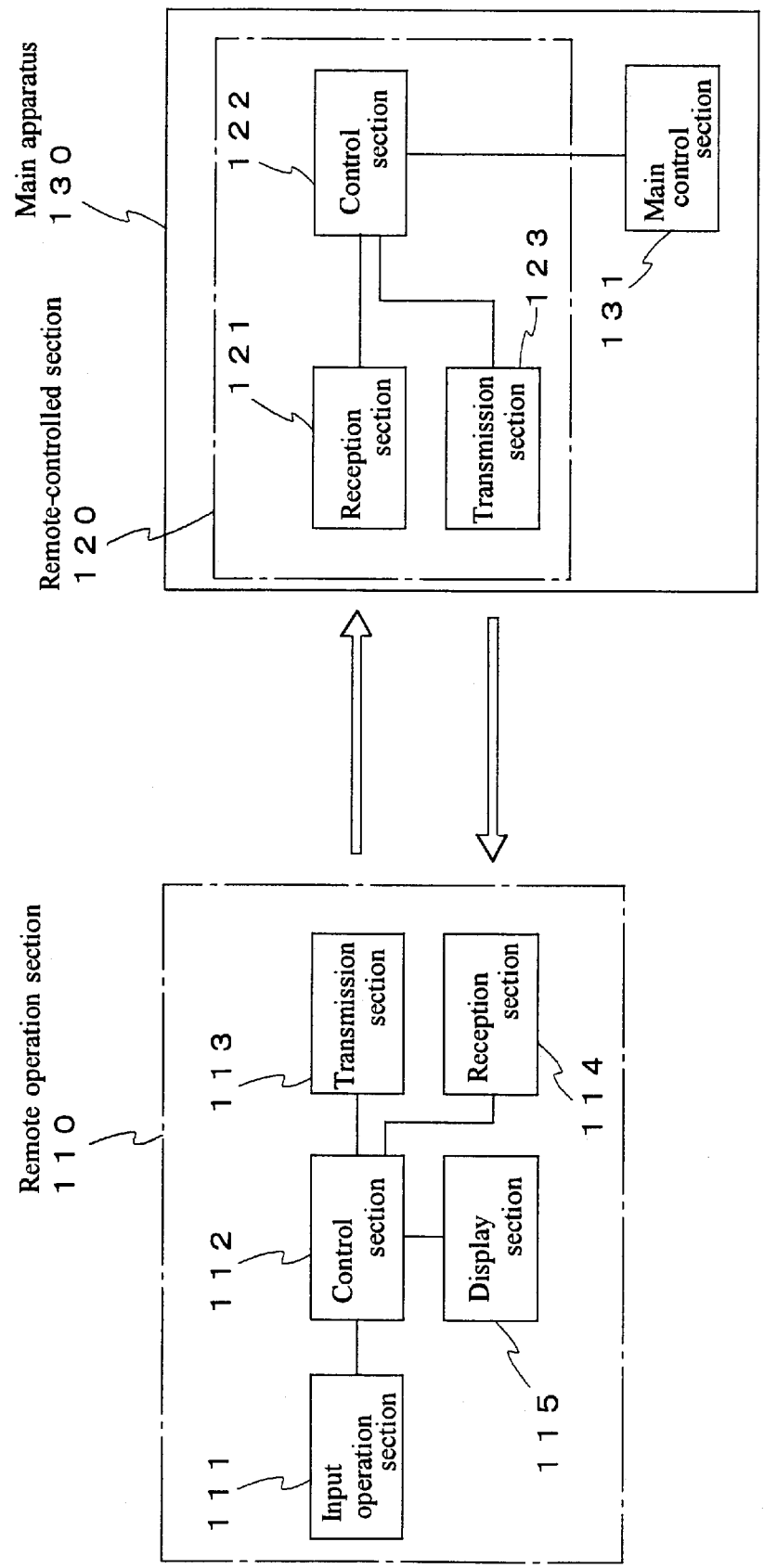

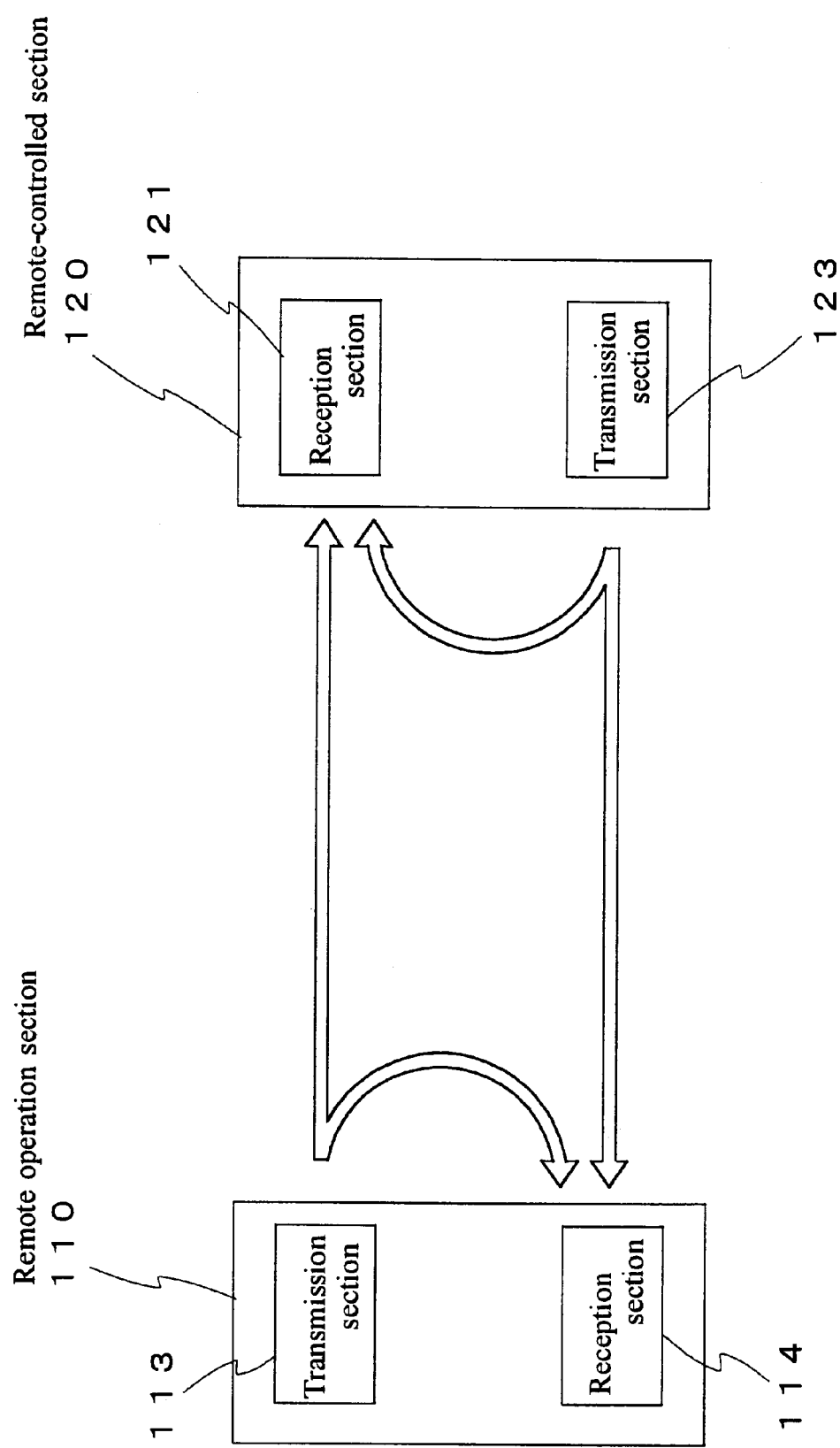

*Fig.* 5
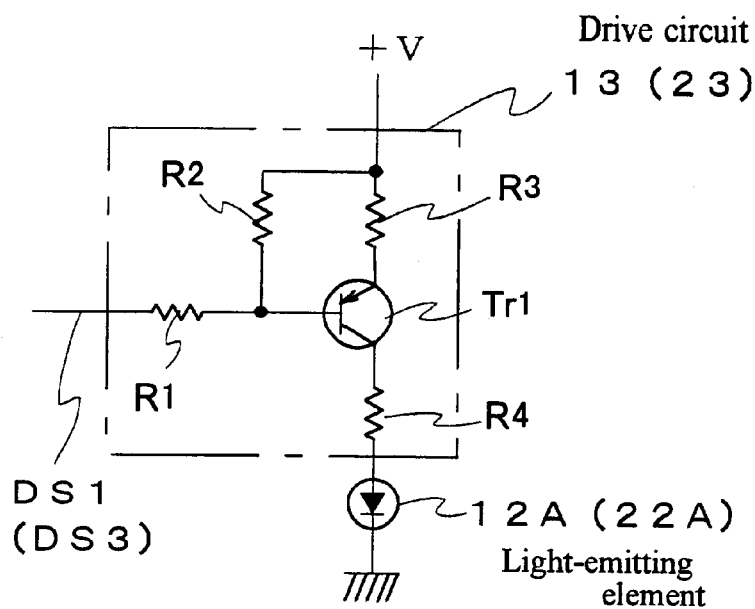
*Fig.* 6
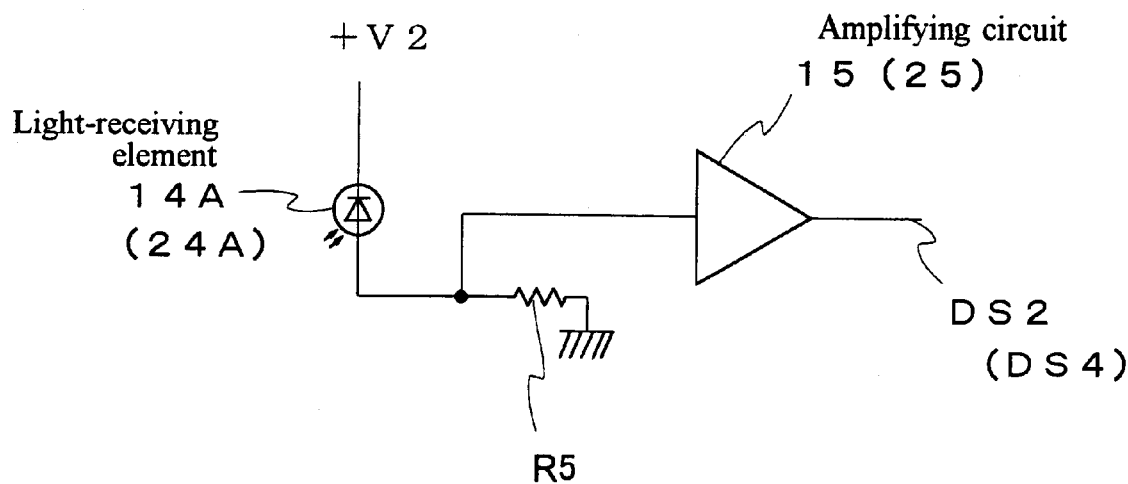

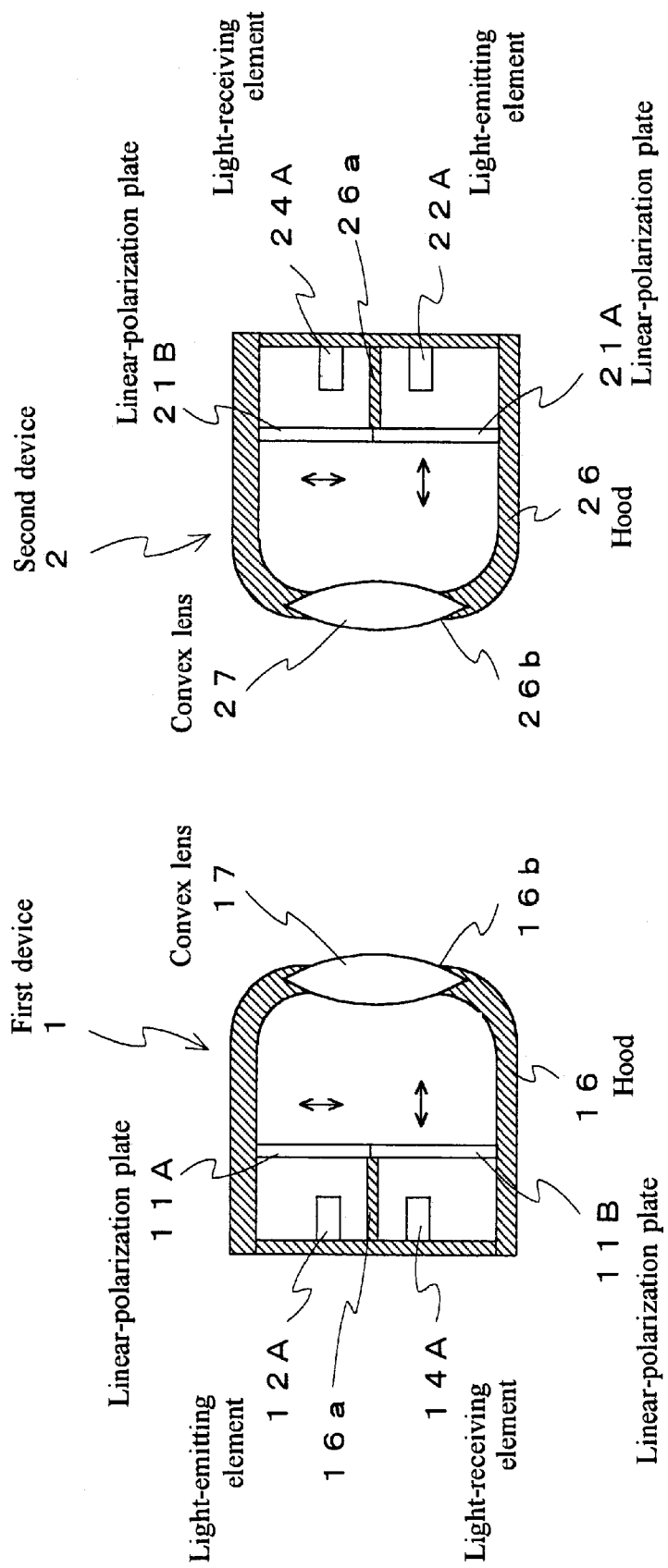

BIDIRECTIONAL OPTICAL COMMUNICATION APPARATUS AND OPTICAL REMOTE CONTROL APPARATUS

BACKGROUND OF THE INVENTION

1. Field of the Invention

The present invention relates to a bidirectional optical communication apparatus and an optical remote control apparatus using this communication apparatus.

2. Description of the Related Art

Conventionally, a remote control apparatus is generally added to an audio visual apparatus such as a television or a CD player, thereby enabling various operations such as switching of television display channels, switching between recording and play and stop, selection from CDs, and turning-on and -off of the apparatus body despite a distance from the main apparatus body.

Such remote control apparatuses generally use infrared rays and are each composed of a set of a remote operation section and a remote-controlled section. In addition, the remote operation section is located on the operator's side, while the remote-controlled section is built into the audio visual apparatus (main apparatus) body. Furthermore, as shown in, for example, FIG. 2, a remote operation section 110 located on the operator' side has an input operation section 111, a control section 112, and a transmission section 113. In addition, a remote-controlled section 120 built into the apparatus main body has a reception section 121 and a control section 122.

In the remote operation section 110, the input operation section 111 comprises a plurality of momentary switches to output to the control section 112 a switch signal indicating which switch has been pressed.

The control section 112 is composed of a well-known CPU, and based on the switch signal received from the input control section 111, creates a transmitted instruction signal to output it to the transmission section 113.

The transmission section 113 is composed of an infrared light-emitting diode and a diode drive circuit, and receives the instruction signal from the control section 112 to drive the infrared light-emitting diode based on this signal in order to radiate it to the external space as an optical signal.

In the remote-controlled section 120, the reception section 121 comprises an infrared photodiode and at least an amplifier etc. (ex. A filter, and a comparator), and receives the infrared light from the remote operation section 110 to output an electric signal corresponding to the infrared signal.

The control section 122 receives the electric signal output from the reception signal 121, and based on this signal, decodes the instruction sent from the remote operation section 110 to output it to a main control section 131 in a main apparatus body 130.

The main control section 131 of the main apparatus body 130 then controls an operation such as switching of the television display channels or turning-on or -off of the power according to the instruction received from the remote-controlled section 120.

Such a conventional remote control apparatus, however, transmits signals in only one direction, that is, from the remote operation section 110 to the remote-controlled section 120. Thus, information such as the operational condition of the main apparatus body 130 cannot be displayed on the remote operation section 110 on the operator's side.

To display information such as the operational condition of the main apparatus body 130 on the remote operation section 110, the information must be transmitted from the remote-controlled section 120 to the remote operation section 110. Thus, as shown in FIG. 3, the remote operation section 110 may be provided with a reception section 114 and a display section 115 while the remote-controlled section 120 may be provided with a transmission section 123. This configuration, however, has the following problems.

Half-duplex and full-duplex communication methods are known as bidirectional communication methods, but the half-duplex communication method requires a protocol for switching between transmission and reception. This results in complicated communication control and difficulties in achieving long continuous data communication due to the incapability of reception during transmission.

In addition, although the full-duplex communication method enables transmission and reception to be simultaneously executed to enable long continuous data communication, a light-emitting element and a light-receiving element are located adjacent to each other in order to reduce the size of the apparatus. Thus, as shown in FIG. 4, an infrared ray radiated from the transmission section is incident on the reception section, causing malfunction. Another cause of malfunction is the incidence on the reception section of an infrared ray radiated from the transmission section and reflected by walls of the room a number of times. One means for preventing such malfunction is to improve the light-emitting directionality of the light-emitting element and the light incidence directionality of the light-receiving element. This means eliminates the incidence on the light-receiving element of light radiated from the light-emitting element despite the proximity between the light-emitting and -receiving elements. In this case, however, the optical axes of two bidirectional lines must be aligned accurately, and this operation is very cumbersome and requires a large amount of time and labor. Therefor, these methods are not so practical.

BRIEF SUMMARY OF THE INVENTION

It is an object of the present invention to provide a bidirectional optical communication apparatus that does not require complicated communication control or accurate optical-axis alignment, as well as an optical remote control apparatus using this communication apparatus.

The present invention provides a bidirectional optical communication apparatus composed of a set of a first device comprising a first transmission section and a first reception section and a second device comprising a second transmission section and a second reception section, wherein the first and second devices use light to communicate data in both directions.

In this configuration, the first transmission section of the first device comprises a first light-emitting element that emits light corresponding to a transmitted digital signal and a first linear-polarization plate located on the light emission side of the fist light-emitting element according to the present invention. The first reception section comprises a first light-receiving element, and a second linear-polarization plate provided on the light incidence side of the first light-receiving element and located in such a way as to pass linear polarization having a polarization surface orthogonal to the polarization surface of linear polarization passing through the first linear-polarization plate.

Furthermore, the second transmission section of the second device comprises a second light-emitting element that emits light corresponding to a transmitted digital signal and a third linear-polarization plate located on the light emission side of the second light-emitting element to pass linear polarization having the plane of polarization of linear polarization passing through the second linear-polarization plate. The second reception section comprises a second light-receiving element; and a fourth linear-polarization plate provided on the light incidence side of the second light-receiving element and located in such a way as to pass linear polarization having the same plane of polarization as that of linear polarization passing through the first linear-polarization plate.

According to this bidirectional optical communication apparatus, when the first device communicates data to the second device, a transmitted digital signal is input to the first light-emitting element of the first transmission section, and the first light-emitting element emits light based on the digital signal.

Furthermore, the first linear-polarization plate radiates the light emitted from the first light-emitting element to the external space as linear polarization. The linear polarization radiated to the external space via the first linear-polarization plate (hereafter referred to as a "first signal light") reaches the second device, passes through the fourth linear-polarization plate of the second reception section, and enters the second light-receiving element. Then, the second light-receiving element converts the first signal light into an electric signal and outputs this signal. The electric signal output from the second light-receiving element mostly corresponds to the digital signal communicated from the first device to the second device.

On the other hand, when the second device communicates data to the first device, a transmitted digital signal is input to the second light-emitting element of the second transmission section, and the second light-emitting element emits light based on the digital signal. Furthermore, the third linear-polarization plate radiates the light emitted from the second light-emitting element to the external space as linear polarization.

The linear polarization radiated to the external space via the third linear-polarization plate (hereafter referred to as a "second signal light") reaches the first device, passes through the second linear-polarization plate of the first reception section, and enters the first light-receiving element. Then, the first light-receiving element converts the second signal light into an electric signal and outputs this signal. This electric signal mostly corresponds to the digital signal communicated from the second device to the first device.

In addition, the polarization surface of linear polarization radiated to the external space from the first transmission section of the first device is orthogonal to the polarization surface of linear polarization radiated to the external space from the second transmission section of the second device. This configuration prevents the linear polarization radiated from the first transmission section from passing through the second linear-polarization plate of the first reception section while preventing the linear polarization radiated from the second transmission section from passing through the fourth linear-polarization plate of the second reception section. This configuration thus precludes a mixture of these two signal lights from being received to prevent malfunction resulting from such a mixture.

This configuration also obviates the need to improve the light-emitting directionality of the light-emitting element and the light incidence directionality of the light-receiving element to eliminate the needs for cumbersome optical-axis alignment. Consequently, data can be communicated using either the half-duplex or full-duplex communication method by simply effectively opposing the first and second devices to each other, so this configuration is practical. In addition, using the full-duplex communication method, long continuous data transfer can be easily achieved without the needs for complicated protocol control.

In addition, according to another configuration of the present bidirectional optical communication apparatus, the first transmission section of the first device comprises a first light-emitting element that emits light corresponding to a transmitted digital signal, a first linear-polarization plate located on the light emission side of the first light-emitting element, and a first wavelength plate on which linear polarization from the first linear-polarization plate is incident to emit circular or elliptic polarization in one of the rotational directions.

The first reception section comprises a first light-receiving element; a second wavelength plate provided on the light incidence side of the first light-receiving element and on which circular or elliptic polarization in the other rotational direction is incident to emit linear polarization; and a second linear-polarization plate provided between the first light-receiving element and the second wavelength plate in such a way as to pass linear polarization from the second wavelength plate to allow it to enter the first light-receiving element.

In addition, the second transmission section of the second device comprises a second light-emitting element that emits light corresponding to a transmitted digital signal, a third linear-polarization plate located on the light emission side of the second light-emitting element, and a third wavelength plate on which linear polarization from the third linear-polarization plate is incident to emit circular or elliptic polarization in the other rotational direction. Furthermore, the second reception section comprises a second light-receiving element, a fourth linear-polarization plate provided on the light incidence side of the second light-receiving element, and a fourth wavelength plate located on the light incidence side of the fourth linear-polarization plate and on which the circular or elliptic polarization from the first wavelength plate is incident to emit linear polarization passing through the fourth linear-polarization plate.

According to this bidirectional optical communication apparatus, when the first device communicates data to the second device, a transmitted digital signal is input to the first light-emitting element of the first transmission section, and the first light-emitting element emits light based on the digital signal. Moreover, the first linear-polarization plate converts light from the first light-emitting element into linear polarization, and the first wavelength plate radiates this linear polarization to the external space as circular or elliptic polarization.

The circular or elliptic polarization radiated to the external space via the first wavelength plate (hereafter referred to as the "first signal light") reaches the second device, where the fourth wavelength plate of the second reception section converts it into linear polarization. This linear polarization passes through the fourth linear-polarization plate to enter the second light-receiving element. Then, the second light-receiving element converts the first signal light into an electric signal and outputs this signal. This electric signal mostly corresponds to the digital signal communicated from the first device to the second device.

On the other hand, when the second device communicates data to the first device, a transmitted digital signal is input to the second light-emitting element of the second transmission section, and the second light-emitting element emits light based on the digital signal. Moreover, the third linear-polarization plate converts light from the second light-emitting element into linear polarization, and the third wavelength plate radiates this linear polarization to the external space as circular or elliptic polarization.

The circular or elliptic polarization radiated to the external space via the third wavelength plate (hereafter referred to as the "second signal light") reaches the first device, where the second wavelength plate of the first reception section converts it into linear polarization. This linear polarization passes through the second linear-polarization plate to enter the first light-receiving element. Then, the first light-receiving element converts the second signal light into an electric signal and outputs this signal. This electric signal mostly corresponds to the digital signal communicated from the second device to the first device.

In addition, the rotational direction of the circular or elliptic polarization radiated to the external space from the first transmission section of the first device is opposite to the rotational direction of the circular or elliptic polarization radiated to the external space from the second transmission section of the second device. This configuration prevents the circular or elliptic polarization radiated from the first transmission section from being incident on the first light-receiving element of the first reception section. It also prevents the circular or elliptic polarization radiated from the second transmission section from being incident on the second light-receiving element of the second reception section. This configuration thus precludes a mixture of these two signal lights from being received to prevent malfunction resulting from such a mixture.

Furthermore, this configuration eliminates the need to improve the light-emitting directionality of the light-emitting element and the light incidence directionality of the light-receiving element, thereby obviating the needs for cumbersome optical-axis alignment. Consequently, data can be communicated using either the half-duplex or full-duplex communication method by simply effectively opposing the first and second devices to each other, so this configuration is practical. In addition, using the full-duplex communication method, long continuous data transfer can be easily achieved without the needs for complicated protocol control.

In another configuration of the bidirectional optical communication apparatus according to the present invention, the first transmission section of the first device comprises a first light-emitting element that emits light corresponding to a transmitted digital signal. The first reception section comprises a first and a second light-receiving elements; a first linear-polarization plate provided on the light incidence side of the first light-receiving element; a second linear-polarization plate provided on the light incidence side of the second light-receiving element; a first wavelength plate located on the light incidence side of the first linear-polarization plate and on which circular or elliptic polarization in one of the rotational directions is incident to emit linear polarization passing through the first linear-polarization plate; a second wavelength plate located on the light incidence side of the second linear-polarization plate and on which circular or elliptic polarization in the other rotational direction is incident to emit linear polarization passing through the second linear-polarization plate; and a subtraction circuit for receiving the electric signals output from the first and second light-receiving elements to output the difference between these electric signal levels.

In addition, the second transmission section of the second device comprises a second light-emitting element that emits light corresponding to a transmitted digital signal, a third linear-polarization plate located on the light emission side of the second light-emitting element, and a third wavelength plate on which linear polarization from the third linear-polarization plate is incident to emit circular or elliptic polarization in one of the rotational directions. Moreover, the second reception section comprises a third light-emitting element; a fourth linear-polarization plate provided on the light incidence side of the third light-receiving element; and a fourth wavelength plate located on the light incidence side of the fourth linear-polarization plate and on which circular or elliptic polarization in the other rotational direction is incident to emit linear polarization passing through the fourth linear-polarization plate.

According to this bidirectional optical communication apparatus, when the first device communicates data to the second device, a transmitted digital signal is input to the first light-emitting element of the first transmission section, and light (hereafter referred to as the "first signal light") is emitted to the external space from the first light-emitting element based on the digital signal. The first signal light is not polarized.

The first signal light radiated from the first device reaches the second device, where the fourth wavelength plate of the second reception section converts this light into various linear polarizations. Only the relevant components of these linear polarizations pass through the fourth linear-polarization plate to enter the third light-receiving element. Then, the third light-receiving element converts the first signal light into an electric signal and outputs this signal. This electric signal mostly corresponds to the digital signal communicated from the first device to the second device.

On the other hand, when the second device communicates data to the first device, a transmitted digital signal is input to the second light-emitting element of the second transmission section, and the second light-emitting element emits light based on the digital signal. Moreover, the third linear-polarization plate converts light from the second light-emitting element into linear polarization, and the third wavelength plate radiates this linear polarization to the external space as circular or elliptic polarization in one of the rotational directions.

The circular or elliptic polarization in one of the rotational directions radiated to the external space via the third wavelength plate (hereafter referred to as the "second signal light") reaches the first device, where the first wavelength plate of the first reception section converts this light into linear polarization. This linear polarization passes through the first linear-polarization plate to enter the first light-receiving element. At this point, natural light scattering in the external space is also incident on the first wavelength-plate. Then, only the relevant components of such light are converted into linear polarization passing through the first linear-polarization plate, which then enters the first light-receiving element. This polarization acts as a noise component.

In addition, the second signal light and natural light are incident on the second wavelength plate of the first reception section, where the second wavelength plate coverts these lights into linear polarization. Only the relevant components of the natural light, that is, only the components polarized circularly or elliptically in the other rotational direction are converted into the linear polarization that can pass through the second linear-polarization plate. The second signal light is converted into linear polarization that cannot pass through the second linear-polarization plate.

Furthermore, electric signals output from the first and second light-receiving elements are input to the subtraction circuit, which then outputs an electric signal having the level of the difference between these two electric signal levels. This configuration removes those components of natural light which are commonly present in the output signals from the first and second light-receiving elements, that is, the noise components. As a result, the electric signal output from the subtraction circuit mostly corresponds to the digital signal communicated from the second device to the first device.

In addition, if the first signal light radiated to the external space from the first transmission section of the first device is incident on the first reception section, it is equivalently incident on both the first and second wavelength plates. Thus, the subtraction circuit removes this light as in the natural light.

Moreover, since in the second reception section of the second device, the fourth wavelength plate and fourth linear-polarization plate are provided on the light incidence side of the third light-receiving element, only those components of the first signal light and natural light incident on the fourth wavelength plate which are polarized circularly or elliptically in the other rotational direction are incident on the third light-receiving element. Thus, even if the second signal light emitted from the second transmission section is incident on the second reception section, it is converted into linear polarization that cannot pass through the fourth linear-polarization plate.

This configuration precludes the first reception section from changing the light radiated from the first transmission section (the first signal light) into an electric signal, while precluding the circular or elliptic polarization radiated from the second transmission section (the second signal light) from being incident on the third light-receiving element of the second reception section.

This configuration thus precludes a mixture of these two signal lights from being received to prevent malfunction resulting from such a mixture.

This configuration also obviates the need to improve the light-emitting directionality of the light-emitting element and the light incidence directionality of the light-receiving element to eliminate the needs for cumbersome optical-axis alignment. Consequently, data can be communicated using either the half-duplex or full-duplex communication method by simply effectively opposing the first and second devices to each other, so this configuration is practical. In addition, using the full-duplex communication method, long continuous data transfer can be easily achieved without the needs for complicated protocol control.

In addition, according to the present invention, the bidirectional optical communication apparatus uses a first and a second light-emitting elements emitting infrared rays that are attenuated less significantly in the atmosphere than visible radiation, and a first and a second light-receiving elements that receive infrared rays to convert them into an electric signal, thereby reducing the attenuation of signals in the communication between the first and second devices to increase the communication distance.

Furthermore, according to the present invention, the first to fourth wavelength plates comprise quarter wavelength plates and the optical signal transmitted between the first and second devices comprises circular polarization, thereby preventing the variation of the reception level caused by the relative rotational angles of the transmission and reception sections and removing disturbing light noise. This configuration enables only the transmitted digital signal to be obtained and substantially reduces the effect of disturbing light noise compared to the prior art, thereby increasing the communication distance.

The present invention also configures an optical remote control apparatus using the above bidirectional optical communication apparatus.

This optical remote control apparatus is composed of a set of a remote operation section located on the operator's side and a remote-controlled section provided in the main apparatus to be remote-controlled, wherein the remote operation section and the remote-controlled section use light to communicate instructions or information in both directions to remote-control the main apparatus.

According to a basic configuration of the present invention, the remote operation section comprises a first transmission section, a first reception section, an Input/Output (I/O) operation section, a first control section, and a display section.

The first transmission section comprises a first light-emitting element that receives a transmitted digital signal from the first control section to emit light corresponding to this digital signal; and a first linear-polarization plate located on the light emission side of the first light-emitting element.

The first reception section comprises a first light-receiving element; and a second linear-polarization plate provided on the light incidence side of the first light-receiving element and located in such a way as to pass linear polarization having a polarization surface orthogonal to the polarization surface of linear polarization passing through the first linear-polarization plate.

The I/O operation section comprises an instruction input means through which the operator inputs a control instruction.

The first control section comprises a transmit signal generation means for generating a digital signal corresponding to an instruction input using the instruction input means and outputting this digital signal to the first transmission section as a transmitted digital signal, an information decoding means for decoding receive information from an electric signal output from the first reception section, and a display control means for displaying on the display section the information decoded by the information decoding means.

The remote-controlled section comprises a second transmission section, a second reception section, and a second control section.

The second transmission section comprises a second light-emitting element that emits light corresponding to a transmitted digital signal and a third linear-polarization plate located on the light emission side of the second light-emitting element to pass linear polarization having the plane of polarization of linear polarization passing through the second linear-polarization plate.

The second reception section comprises a second light-receiving element; and a fourth linear-polarization plate provided on the light incidence side of the second light-receiving element and located in such a way as to pass linear polarization having the same plane of polarization as that of linear polarization passing through the first linear-polarization plate.

The second control section comprises a transmit signal generation means for generating a digital signal corresponding to information communicated to the remote operation section and outputting this digital signal to the second transmission section as a transmitted digital signal, an instruction decoding means for decoding an electric signal output from the second reception section, into a control instruction, and an operation control means for controlling the operation of the main apparatus to be controlled based on the control instruction decoded by the instruction decoding means.

According to this optical remote control apparatus, when the remote operation section communicates an instruction to the remote-controlled section and if the operator inputs an arbitrary instruction for the main apparatus via the instruction input means of the I/O operation section, then the transmit signal generation means of the first control section generates a digital signal corresponding to the instruction. This digital signal is input to the first light-emitting element of the first transmission section, and the first light-emitting element emits light based on the signal.

Moreover, the first linear-polarization plate radiates the light emitted from the first light-emitting element to the external space as linear polarization.

The linear polarization radiated to the external space via the first linear-polarization plate (hereafter referred to as the "first signal light") reaches the remote-controlled section, passes through the fourth linear-polarization plate of the second reception section, and enters the second light-receiving element. Then, the second light-receiving element converts the first signal light into an electric signal and outputs this signal. This electric signal mostly corresponds to the digital signal communicated from the remote operation section to the remote-controlled section.

The electric signal output from the second light-receiving element is input to the second control section, and the instruction decoding means decodes the electric signal into the control instruction. Based on the decoded control instruction, the operation control means controls the operation of the main apparatus.

On the other hand, when the remote-controlled section communicates information to the remote operation section, the transmit signal generation means of the second control section generates a digital signal corresponding to the information communicated to the remote operation section, and this digital signal is output to the second transmission section as a transmitted digital signal. This digital signal is input to the second light-emitting element of the second transmission section, and the second light-emitting element emits light based on the signal. Furthermore, the third linear-polarization plate radiates the light emitted from the second light-emitting element to the external space as linear polarization.

The linear polarization emitted to the external space via the third linear-polarization plate (hereafter referred to as the "second signal light") reaches the remote operation section, passes through the second linear-polarization plate of the first reception section, and enters the first light-receiving element. Then, the first light-receiving element converts the second signal light into an electric signal and outputs this signal. This electric signal mostly corresponds to the digital signal communicated from the remote-controlled section to the remote operation section.

The electric signal output from the first light-receiving element is input to the first control section, and the information decoding means decodes the electric signal into the receive information. Moreover, the display control means displays on the display section the receive information decoded by the information decoding means.

In addition, the polarization surface of linear polarization radiated to the external space from the first transmission section of the remote operation section is orthogonal to the polarization surface of linear polarization radiated to the external space from the second transmission section of the remote-controlled section. This configuration prevents the linear polarization radiated from the first transmission section from passing through the second linear-polarization plate of the first reception section while preventing the linear polarization radiated from the second transmission section from passing through the fourth linear-polarization plate of the second reception section. This configuration thus precludes a mixture of these two signal lights from being received to prevent malfunction resulting from such a mixture.

This configuration also obviates the need to improve the light-emitting directionality of the light-emitting element and the light incidence directionality of the light-receiving element to eliminate the needs for cumbersome optical-axis alignment. Consequently, data can be communicated using either the half-duplex or full-duplex communication method by simply effectively opposing the remote operation section and the remote-controlled section to each other, so this configuration is practical. In addition, using the full-duplex communication method, long continuous data transfer can be easily achieved without the needs for complicated protocol control. Moreover, the information communicated from the main apparatus can be displayed on the display section of the remote operation section located on the operator's side, thereby improving the operability of remote control and enabling information (for example textual information) to be displayed to extend the applicable range of the apparatus.

In addition, according to another configuration of the present optical remote control apparatus, the above bidirectional optical communication apparatus is adapted to provide various unique effects.

BRIEF DESCRIPTION OF THE DRAWINGS

FIG. 3 describes a general configuration of the bidirectional optical communication apparatus;

FIG. 4 describes problems associated with the application of a bidirectional optical communication apparatus;

FIG. 5 shows a main electric circuit in a transmission section according to the first embodiment of the present invention;

FIG. 6 shows a main electric circuit in a reception section according to the first embodiment of the present invention;

FIG. 7 shows the structure of the integral part of the first embodiment of the present invention;

DETAILED DESCRIPTION

The present invention will be described below in detail with reference to the accompanying drawings.

Figure 1:
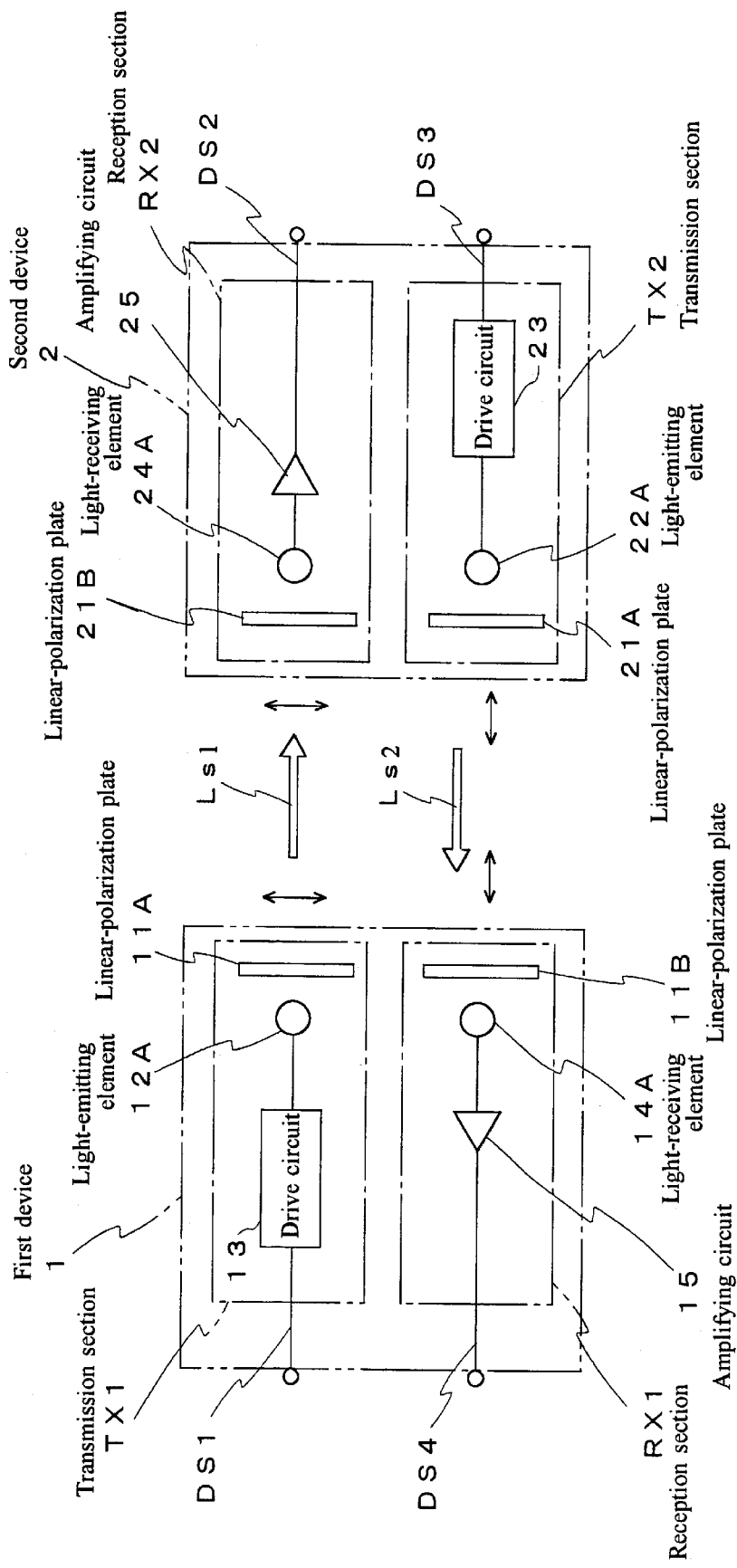
FIG. 1 is a block diagram showing the integral part of a bidirectional optical communication apparatus according to a first embodiment of the present invention.
Figure 2:
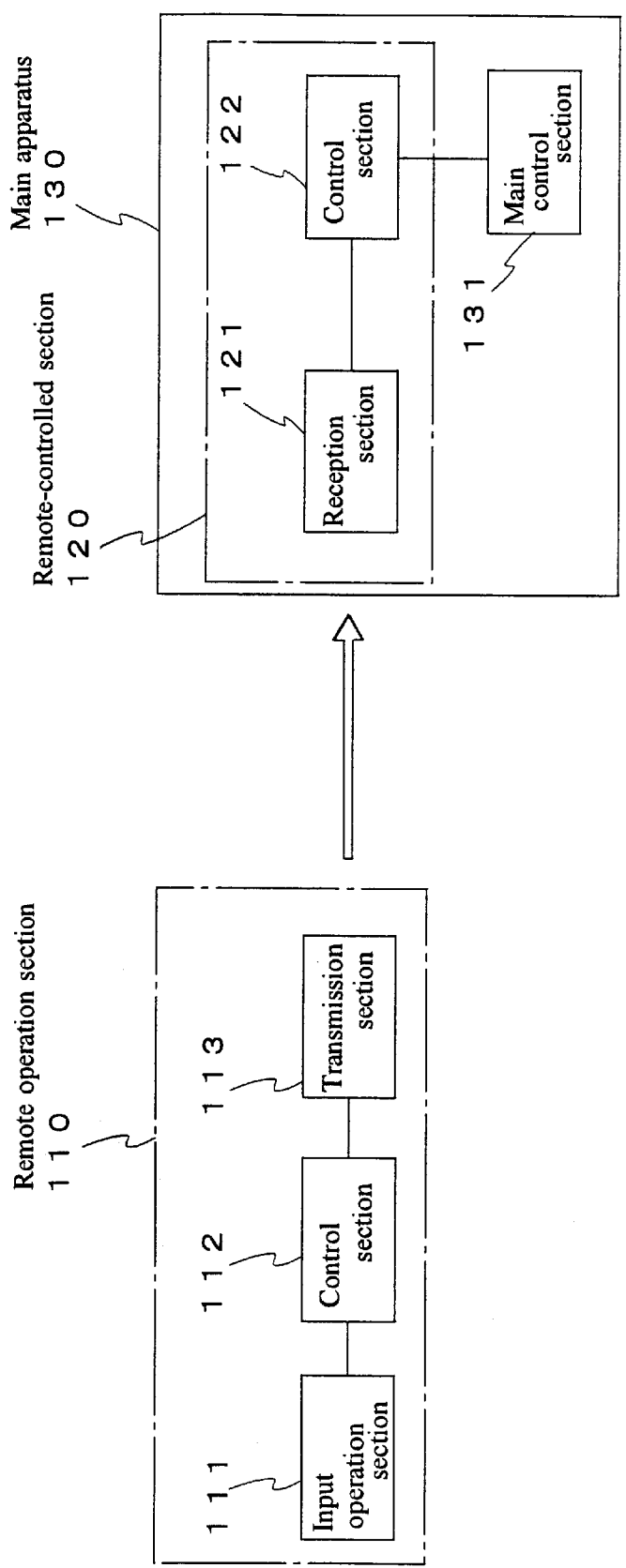
FIG. 2 is a block diagram showing an example of a conventional remote control apparatus.

FIG. 1 is a block diagram showing the integral part of a bidirectional optical communication apparatus according to a first embodiment of the present invention. In this figure, 1 is a first device and 2 is a second device. The set of the first and second devices 1 and 2 constitute the bidirectional optical communication apparatus.

The first device 1 comprises a transmission section (TX1) and a reception section (RX1). The transmission section (TX1) is composed of a linear-polarization plate 11A, a light-emitting element 12A, and a drive circuit 13.

A first digital signal (DS1) representing information transmitted from the first device 1 to the second device 2 is input to the drive circuit 13. The drive circuit 13 drives the light-emitting element 12A based on the first digital signal (DS1) to emit light from the element 12A.

A linear-polarization plate 11A is located on the light emission side of the light-emitting element 12A. Light emitted from the light-emitting element 12A passes through the linear-polarization plate 11A and is then radiated through the external space to the second device 2 as linear polarization (a first signal light (Ls1)).

The reception section (RX1) is composed of a linear-polarization plate 11B, a light-receiving element 14A, and an amplifying circuit 15. A linear-polarization plate 11B is located on the light incidence side of the light-receiving element 14A. The linear-polarization plate 11B passes only linear polarization having a plane of polarization orthogonal to the plane of polarization of linear polarization emitted from the linear-polarization plate 11A of the transmission section (TX1).

The light incident on the linear-polarization plate 11B from the external space passes through the linear-polarization plate 11B to enter the light-receiving element 14A. The light-receiving element 14A converts the light incident thereon into an electric signal and outputs this signal. The amplifier 15 amplifies the electric signal output from the light-receiving element 14A and outputs the amplified signal as a fourth digital signal (DS4).

On the other hand, the second device 2 comprises a transmission section (TX2) and a reception section (RX2). The transmission (TX2) and reception (RX2) sections have almost the same configurations as in the first device 1. That is, the transmission section (TX2) is composed of a linear-polarization plate 21A, a light-emitting element 22A, and a drive circuit 23.

A third digital signal (DS3) representing information transmitted from the second device 2 to the first device 1 is input to the drive circuit 23. The drive circuit 23 drives the light-emitting element 22A based on the third digital signal (DS3) to emit light from the element 22A.

The linear-polarization plate 21A is located on the light emission side of the light-emitting element 22A. Light emitted from the light-emitting element 22A passes through the linear-polarization plate 21A and is then radiated through the external space to the first device 1 as linear polarization (a second signal light (Ls2)).

The linear polarization that can pass through the linear-polarization plate 21A is set the same as the linear polarization that can pass through the linear-polarization plate 11B.

The reception section (RX2) is composed of a linear-polarization plate 21B, a light-receiving element 24A, and an amplifying circuit 25. The linear-polarization plate 21B is located on the light incidence side of the light-receiving element 24A. The linear-polarization plate 21B passes only linear polarization having the same plane of polarization as that of linear polarization emitted from the linear-polarization plate 11A of the transmission section (TX1).

The light incident on the linear-polarization plate 21B from the external space passes through the linear-polarization plate 21B to enter the light-receiving element 24A. The light-receiving element 24A converts the light incident thereon into an electric signal. Furthermore, the amplifier 25 amplifies the electric signal output from the light-receiving element 24A and outputs the amplified signal as a second digital signal (DS2).

According to this embodiment, a main electric circuit for the transmission (TX1 and TX2) and reception (RX1 and RX2) sections has the configuration shown in FIGS. 5 and 6.

That is, the drive circuits 13 and 23 in the transmission sections (TX1 and TX2) are each composed of resistors (R1 to R4) and a transistor (Tr1). The first (DS1) or third (DS3) digital signal is input to one end of the resistor (R1). The other end of the resistor (R1) is connected to the base of the transistor (Tr1) and one end of the resistor (R2). Moreover, the emitter of the transistor (Tr1) is connected to one end of the resistor (R3).

In addition, a predetermined positive voltage +V is applied to the other end of each of the resistors (R2 and R3). Moreover, the collector of the transistor (Tr1) is connected to the anode of the light-emitting element 12A or 22A via the resistor (R4). In addition, the cathodes of the light-emitting elements 12A and 22A are grounded.

Thus, the transistor (Tr1) performs a switching operation corresponding to the first (DS1) or third (DS3) digital signal to apply a voltage to the light-emitting element 12A or 22A in order to drive it.

In the reception sections (RX1 and RX2), the anodes of the light-receiving elements 14A and 24A are connected to the input side of the amplifying circuits 15 and 25, respectively, and are grounded via a resistor (R5). Furthermore, a predetermined positive voltage +V2 is applied to the cathode of the light-receiving element 14A or 24A.

Accordingly, an output current from the light-receiving element 14A or 24A is converted into a voltage by the resistor (R5) and input to the amplifier 15 or 25, respectively.

The light-emitting elements 12A and 22A and light-receiving elements 14A and 24A comprise infrared elements; that is, the light-emitting elements 12A and 22A comprise infrared LEDs and the light-receiving elements 14A and 24A comprise infrared photodiodes.

According to this embodiment, in each of the first and second devices 1 and 2, the light-emitting elements 12A and 22A and the light-receiving elements 14A and 24A are arranged as shown in, for example, FIG. 7. In the first device 1, a hood 16 covers the linear-polarization plates 11A and 11B, the light-emitting element 12A, and the light-receiving element 14A. Furthermore, a shielding plate 16a is located between the light-emitting element 12A and the light-receiving element 14A. In addition, a convex lens 17 is provided in an opening 16b for light incidence.

The second device 2 has a similar configuration; a hood 26 covers the linear-polarization plates 21A and 21B, the light-emitting element 22A, and the light-receiving element 24A, a shielding plate 26a is located between the light-emitting element 22A and the light-receiving element 24A, and a convex lens 27 is provided in an opening 26b for light incidence.

FIG. 7 has a spatial margin therein, but of course, the components are actually densely mounted in the apparatus.

According to the above configuration, in the first device 1, an infrared ray emitted from the light-emitting element 12A, which is free from disturbing light, passes through the linear-polarization plate 11A to enter the convex lens 17. Subsequently, the convex lens 17 converts this infrared ray into a parallel beam (the first signal light (Ls1)) and emits this beam through the external space to the second device 2.

Upon reaching the second device 2, the first signal light (Ls1) passes through the convex lens 27 to enter the linear-polarization plate 21B. The light incident on the linear-polarization plate 21B passes through the linear-polarization plate 21B to enter the light-receiving element 24A. At this point, only linearly polarized components having the relevant plane of polarization can pass through the linear-polarization plate 21B, whereas no light having other plane of polarization is incident on the light-receiving element 24A.

In addition, in the second device 2, an infrared ray emitted from the light-emitting element 22A, which is free from disturbing light, passes through the linear-polarization plate 21A. Subsequently, the convex lens 27 converts the light that has passed through the linear-polarization plate 21A, into a parallel beam (the second signal light (Ls2)) and emits this beam through the external space to the first device 1. Upon reaching the first device 1, the second signal light (Ls2) passes through the convex lens 17 to enter the linear-polarization plate 11B. The light incident on the linear-polarization plate 11B passes through the linear-polarization plate 11B to enter the light-receiving element 14A. At this point, only linearly polarized components having the relevant polarization surface can pass through the linear-polarization plate 11B, whereas no light having other polarization surface is incident on the light-receiving element 14A.

Figure 8:
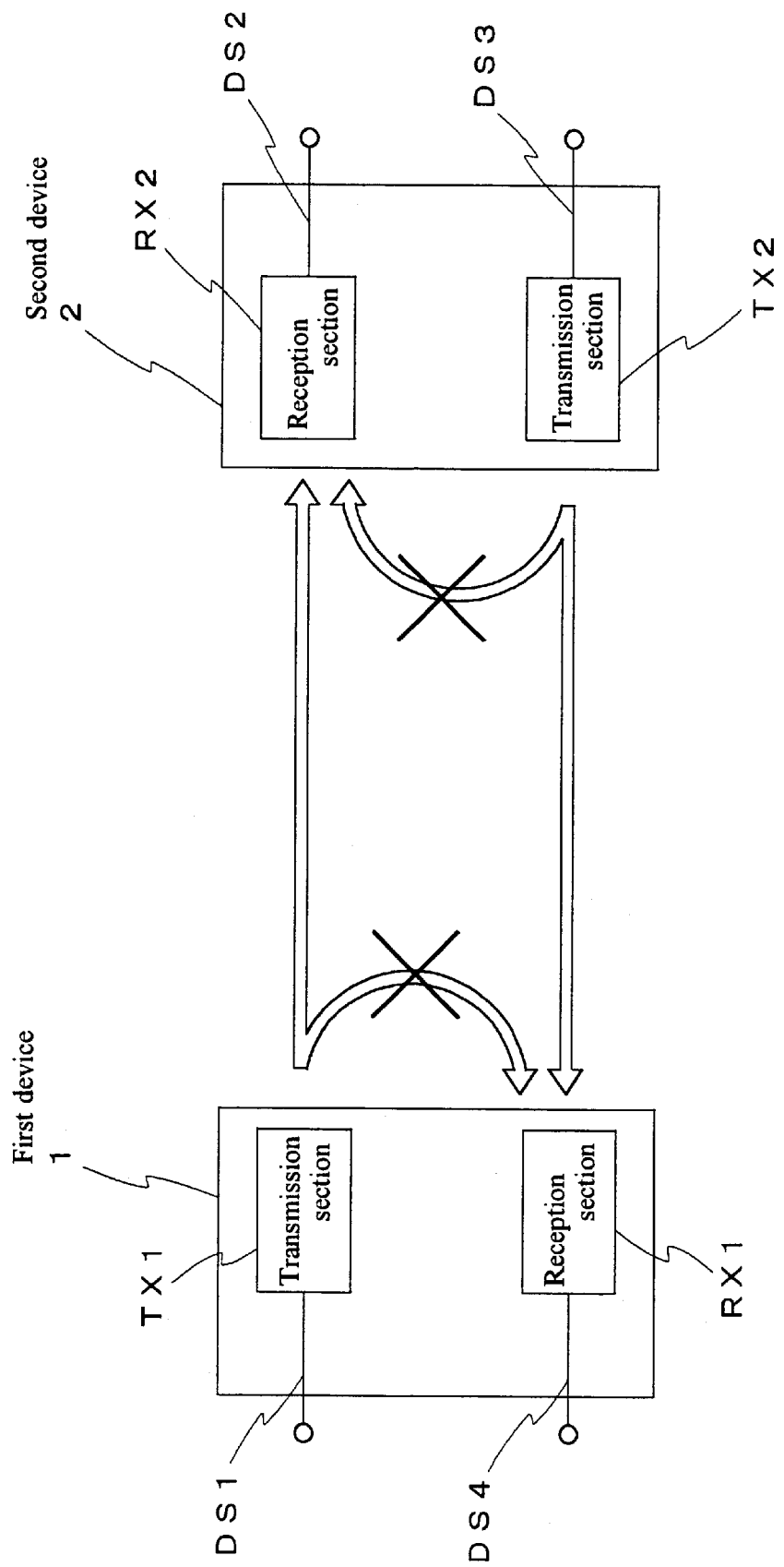
FIG. 8 describes an interference elimination effect according to the first embodiment of the present invention.

As shown in FIG. 8, this configuration prevents the first signal light (Ls1) radiated from the transmission section (TX1) of the first device 1 from being incident on the light-receiving element 14A of the reception section (RX1) of the device 1. This configuration also prevents the second signal light (Ls2) radiated from the transmission section (TX2) of the second device 2 from being incident on the light-receiving element 24A of the reception section (RX2) of the device 2. This configuration thus precludes the first and second devices 1 and 2 from receiving a mixture of the first and second signal lights (Ls1 and Ls2) to prevent malfunction caused by such a mixture.

This configuration also eliminates the need to improve the light-emitting directionality of the light-emitting elements 12A and 22A and the light incidence directionality of the light-receiving elements 14A and 24A to obviate the needs for cumbersome optical-axis alignment. Consequently, data can be communicated using either the half-duplex or full-duplex communication method by simply effectively opposing the first and second devices 1 and 2 to each other, so this configuration is practical. In addition, using the full-duplex communication method, long continuous data transfer can be easily achieved without the needs for complicated protocol control.

Moreover, infrared rays, which are used for the communication between the first and second devices 1 and 2, are attenuated less significantly in the atmosphere than visible light, thereby reducing errors in communicating information.

Next, a second embodiment of the present invention will be described.

Figure 9:
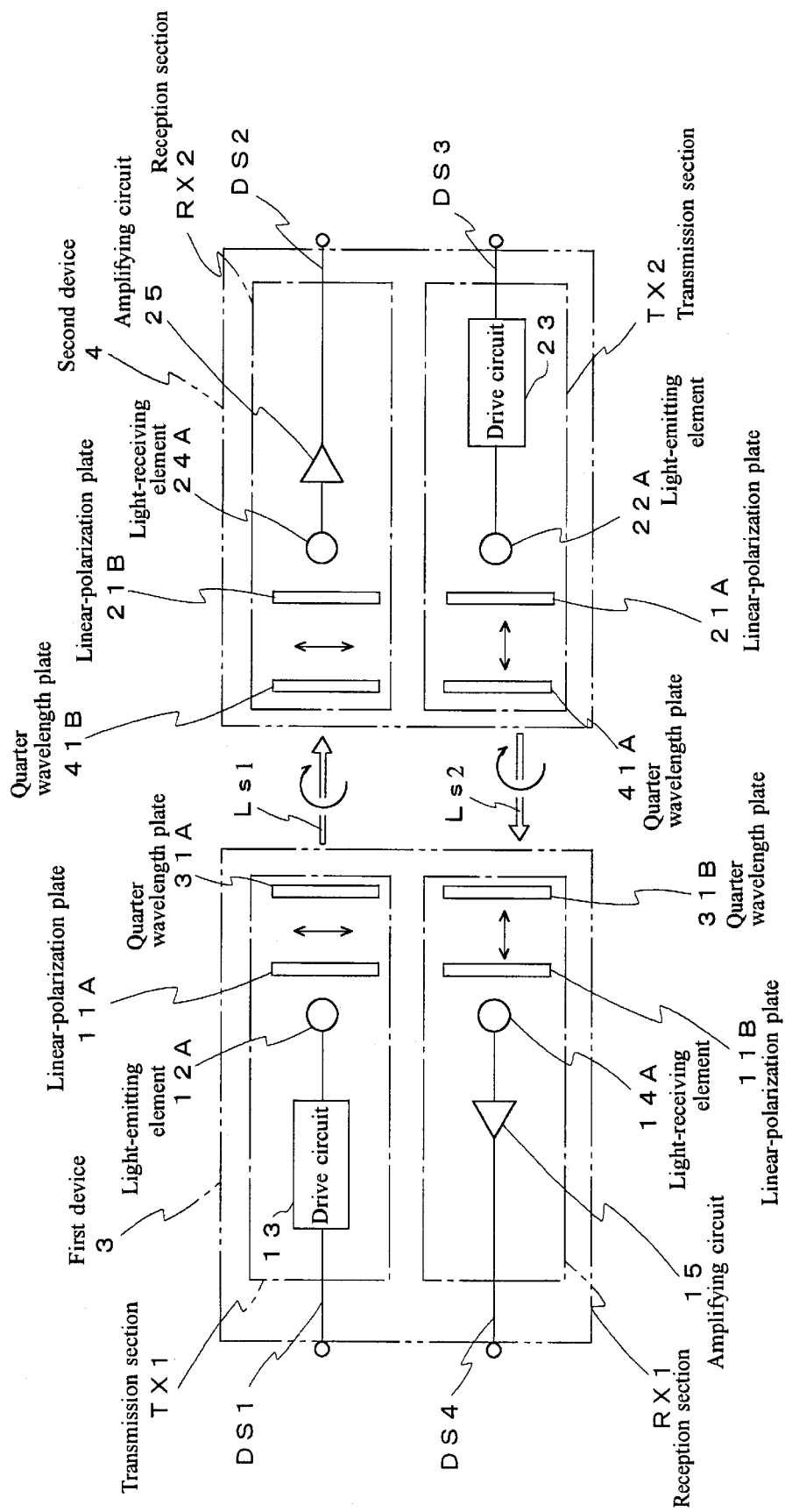
FIG. 9 is a block diagram showing the integral part of a bidirectional optical communication apparatus according to a second embodiment of the present invention.

FIG. 9 is a block diagram showing the integral part of a bidirectional optical communication apparatus according to the second embodiment of the present invention. In this figure, the same components as in the first embodiment have the same reference numerals and their description is omitted.

The second embodiment differs from the first embodiment in that the first and second signal lights (Ls1 and Ls2) comprise circular polarizations having different rotational directions.

That is, in the transmission sections (TX1 and TX2), quarter wavelength plates 31A and 41A are located on the light emission side of the linear-polarization plates 11A and 21A, respectively. Furthermore, in the reception sections (RX1 and RX2), quarter wavelength plates 31B and 41B are located on the light incidence side of the linear-polarization plates 11B and 21B, respectively. A first and a second devices 3 and 4 comprise the quarter wavelength plates in this manner, thereby enabling communication by means of circular polarization.

Figure 10:
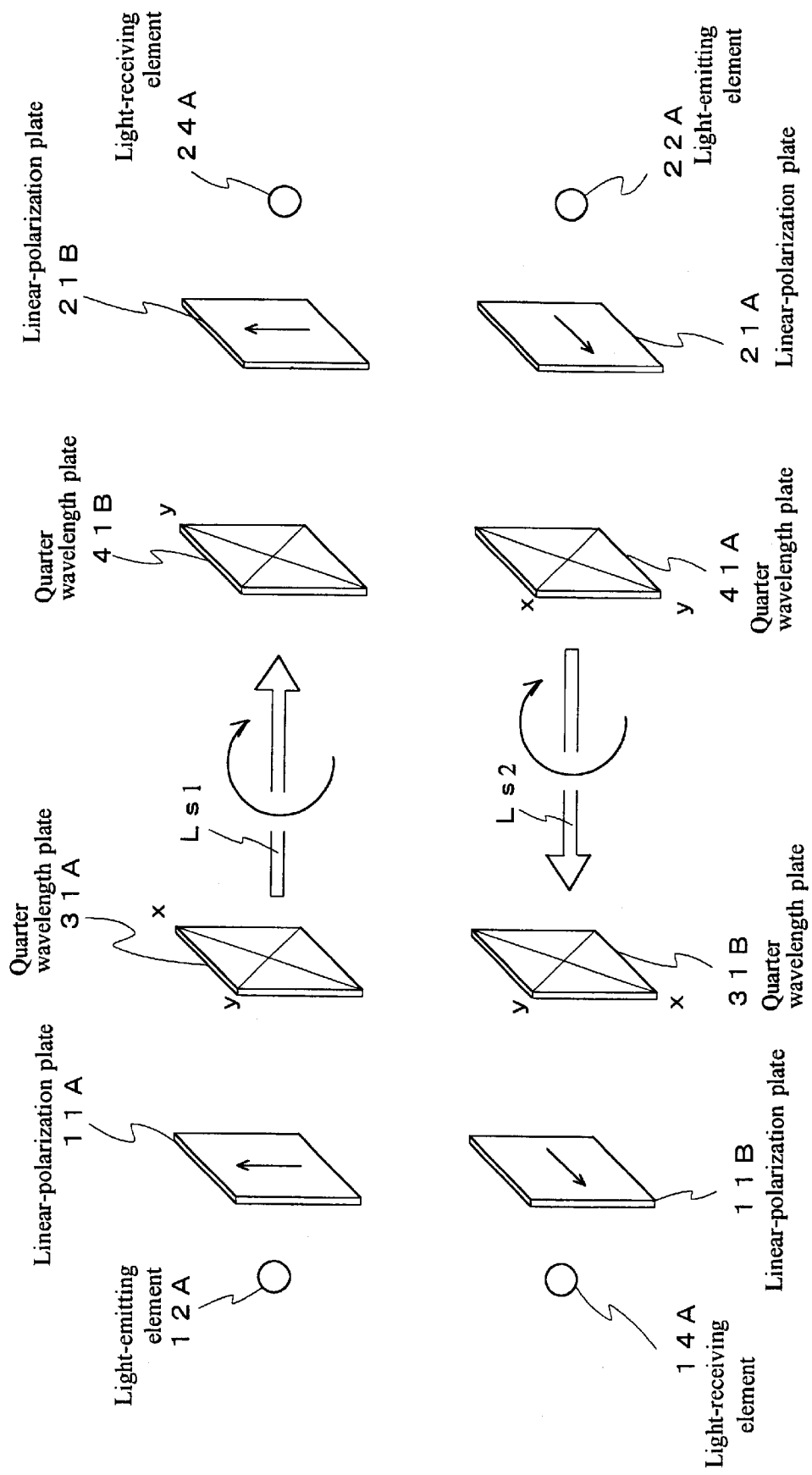
FIG. 10 describes the relationship between linear-polarization plates and quarter wavelength plates according to the second embodiment of the present invention.

In addition, as shown in FIG. 10, the quarter wavelength plate 31A in the transmission section (TX1) of the first device 3 is located in such a way that the plane of polarization of linear polarization passing through the linear-polarization plate 11A is offset from the optical axis x, y of the quarter wavelength plate 31A by +45°.

Moreover, the quarter wavelength plate 41B in the reception section (RX2) of the second device 4 is located in such a way that the plane of polarization of linear polarization passing through the plate 41B is offset from the optical axis x, y of the plate 41B by −45°.

This configuration enables the reception section (RX2) of the second device 4 to reproduce the linear polarization radiated from the transmission section (TX1) of the first device 3.

In addition, the quarter wavelength plate 41A in the transmission section (TX2) of the second device 4 is located in such a way that the plane of polarization of linear polarization passing through the linear-polarization plate 21A is offset from the optical axis x, y of the quarter wavelength plate 31A by −45°.

Moreover, the quarter wavelength plate 31B in the reception section (RX1) of the first device 3 is located in such a way that the plane of polarization of linear polarization passing through the plate 31B is offset from the optical axis x, y of the plate 41B by +45°.

This configuration enables the reception section (RX1) of the first device 3 to reproduce the linear polarization radiated from the transmission section (TX2) of the second device 4.

Figure 11:
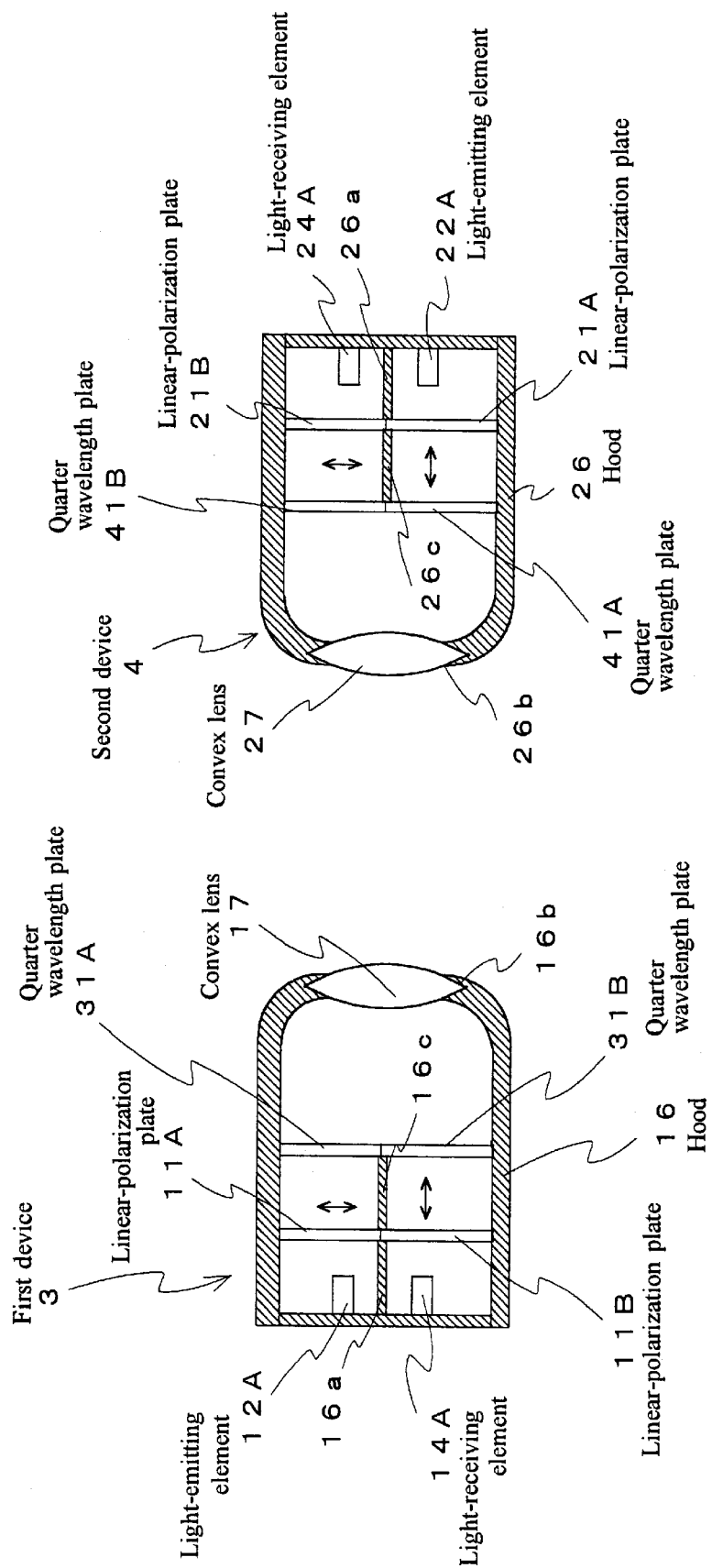
FIG. 11 shows the structure of the integral part of the second embodiment of the present invention.

In addition, in each of the first and second devices 3 and 4, shielding plates 16a, 16c, 26c, and 26c are provided between the light-emitting (12A and 22A) and light-receiving (14A and 24A) elements and the quarter wavelength plates 31A, 31B, 41A, and 41B to block the paths of the first and second signal lights (Ls1 and Ls2), respectively, as shown in FIG. 11. FIG. 11 has a spatial margin therein, but of course, the components are actually densely mounted in the apparatus.

The first signal light (Ls1) radiated from the transmission section (TX1) of the first device 3 and the second signal light (Ls2) radiated from the transmission section (TX2) of the second device 4 are circular polarizations having different rotational directions. This configuration prevents the first signal light (Ls1) from being incident on the light-receiving element 14A of the reception section (RX1) and preventing the second signal light (Ls2) from being incident on the light-receiving element 24A of the reception section (RX2).

This configuration thus precludes the first and second devices 3 and 4 from receiving a mixture of the first and second signal lights (Ls1 and Ls2) to prevent malfunction caused by such a mixture.

This configuration also eliminates the need to improve the light-emitting directionality of the light-emitting elements 12A and 22A and the light incidence directionality of the light-receiving elements 14A and 24A to obviate the needs for cumbersome optical-axis alignment. Consequently, data can be communicated using either the half-duplex or full-duplex communication method by simply effectively opposing the first and second devices 3 and 4 to each other, so this configuration is practical. In addition, using the full-duplex communication method, long continuous data transfer can be easily achieved without the needs for complicated protocol control.

Moreover, infrared rays, which are used for the communication between the first and second devices 3 and 4, are attenuated less significantly in the atmosphere than visible light, thereby reducing errors in communicating information.

In addition, the first and second signal lights (Ls1 and Ls2) propagate through the space as circular polarizations, thereby preventing the variation of the reception level caused by the rotational angles of the transmission (TX1 and TX2) and reception (RX1 and RX2) sections or the rotational angles of the first device and second device and enabling only the transmitted digital signal free from disturbing light noise to be obtained. Accordingly, compared to the prior art, the effect of disturbing light noise can be substantially reduced to increase the communication distance.

Although the second embodiment uses the quarter wavelength plates to provide the first and second signal lights (Ls1 and Ls2) comprising circular polarizations having different rotational directions, almost the same effects can be obtained when the first and second signal lights (Ls1 and Ls2) comprise elliptic polarizations having different rotational directions.

Next, a third embodiment of the present invention will be described.

Figure 12:
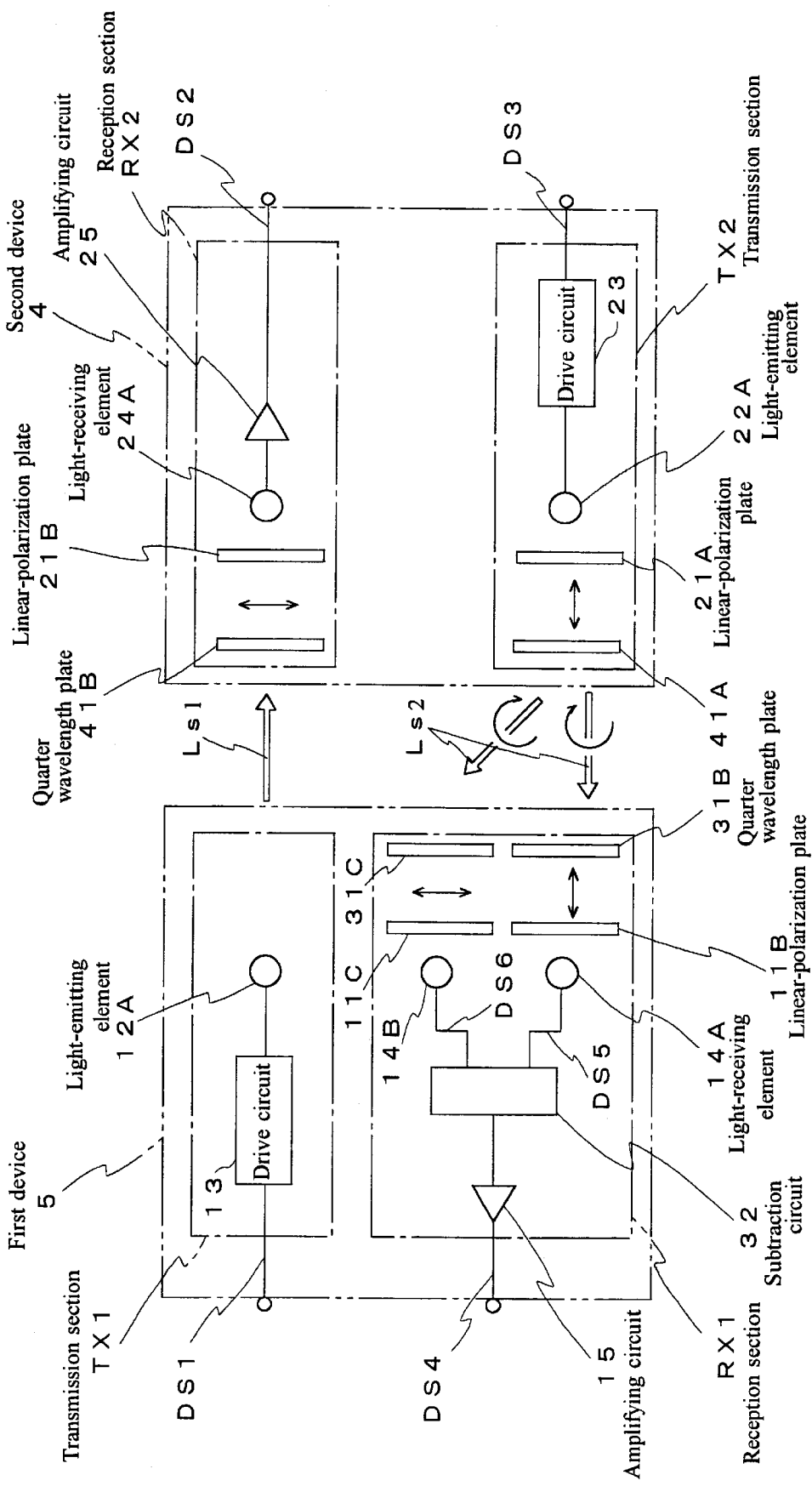
FIG. 12 is a block diagram showing the integral part of a bidirectional optical communication apparatus according to a third embodiment of the present invention.

FIG. 12 is a block diagram showing the integral part of a bidirectional optical communication apparatus according to the third embodiment of the present invention. In this figure, the same components as in the second embodiment have the same reference numerals and their description is omitted.

The third embodiment differs from the second embodiment in that the first signal light (Ls1) comprises non-polarized light while the second signal light (Ls2) comprises circular polarization as in the second embodiment and in that the reception section (RX1) of a first device 5 removes the first signal light (Ls1).

That is, the transmission section (TX1) of the first device 5 radiates light from the light-emitting element 12A directly to the external space as the first signal light (LS1), as shown in FIG. 12.

In addition, the reception section (RX1) of the first device 5 is composed of a linear-polarization plate 11C, a light-receiving element 14B, a quarter wavelength plate 31C, and a subtraction circuit 32 as well as the components of the reception section (RX1) of the first device 5 according to the second embodiment.

In the reception section (RX1), the linear-polarization plate 11B and the quarter wavelength plate 31B are located on the light incidence side of the light-receiving element 14A in this order, as in the second embodiment. Thus, an externally incident light passes through the quarter wavelength plate 31B and linear-polarization plate 11B to enter the light-receiving element 14A. Furthermore, the linear-polarization plate 11C and the quarter wavelength plate 31C are located on the light incidence side of the light-receiving element 14B in this order. Thus, an externally incident light passes through the quarter wavelength plate 31C and linear-polarization plate 11C to enter the light-receiving element 14B.

Two electric signals (DS5 and DS6) output from these two light-receiving elements 14A and 14B are input to the subtraction circuit 32. The subtraction circuit 32 outputs an electric signal having the level of the difference between these two electric signal levels. The amplifying circuit 15 amplifies the electric signal output from the subtraction circuit 32 and outputs it as a fourth digital signal (DS4). In the case that a fourth digital signal (DS2 and DS4) is distorted, for example under the influence of a characteristics of transmitting between transmission section and reception section, a fourth digital signal is regenerated pulse shaped by filtering if necessary.

The positional relationship between the linear-polarization plate 14B and the quarter wavelength plate 31C is set the same as that between the linear-polarization plate 14B and the quarter wavelength plate 31C according to the second embodiment. That is the linear-polarization plate 11C passes only linear polarization having a plane of polarization orthogonal to the plane of polarization of linear polarization that can pass through the linear-polarization plate 11B. In addition, the quarter wavelength plate 31C converts circular polarization having the rotational direction opposite to that of the second signal light (Ls2) into the linear polarization that can pass through the linear-polarization plate 11C.

A main electric circuit in the reception section (RX1) of the first device 5 has the configuration shown in FIG. 13(a). That is, in the reception section (RX1), the subtraction circuit 32 is composed of a resistor 321 and an amplifier 322. One end of the resistor 321 is connected to each of the anode of the light-receiving element (a photodiode) 14A, the cathode of the light-receiving element (a photodiode) 14B, and an input terminal of the amplifier 322. In addition, the other end of the resistor 321 is grounded. Moreover, a predetermined positive voltage +V3 is applied to the cathode of the light-receiving element 14A, and a predetermined negative voltage −V3 is applied to the anode of the light-receiving element 14B.

Then, the resistor 321 converts a current (I1–I2) for the difference between an output current I1 (the electric signal (DS5)) from the light-receiving element 14A and an output current I2 (the electric signal (DS6)) from the light-receiving element 14B into a voltage and inputs this voltage to the amplifier 322.

The second device 4 has a configuration similar to that in the second embodiment.

Figure 13:
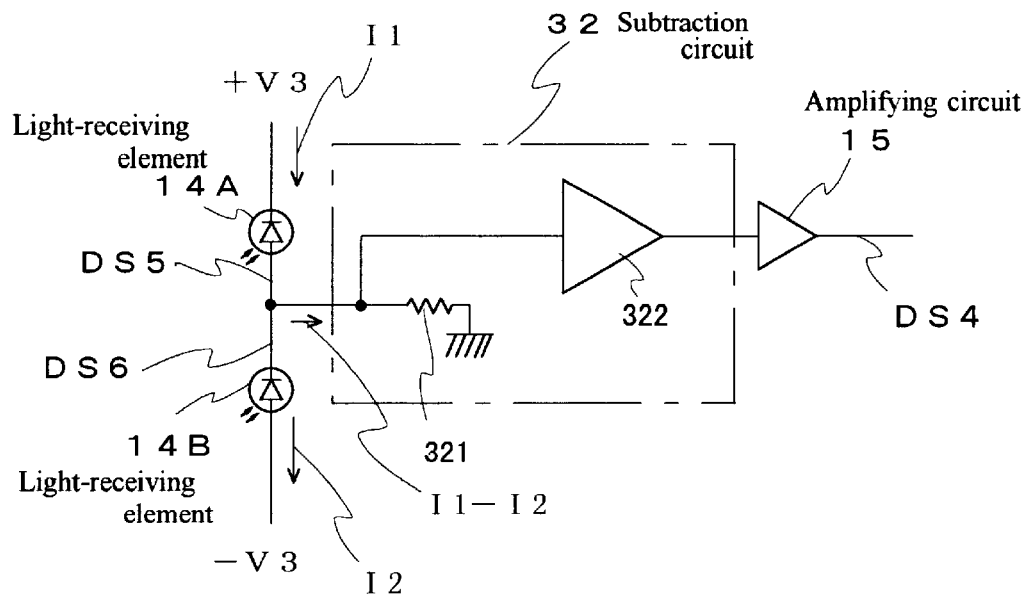
FIGS. 13(a) and (b) show a main electric circuit in a reception section according to the third embodiment of the present invention;.
Figure 13:
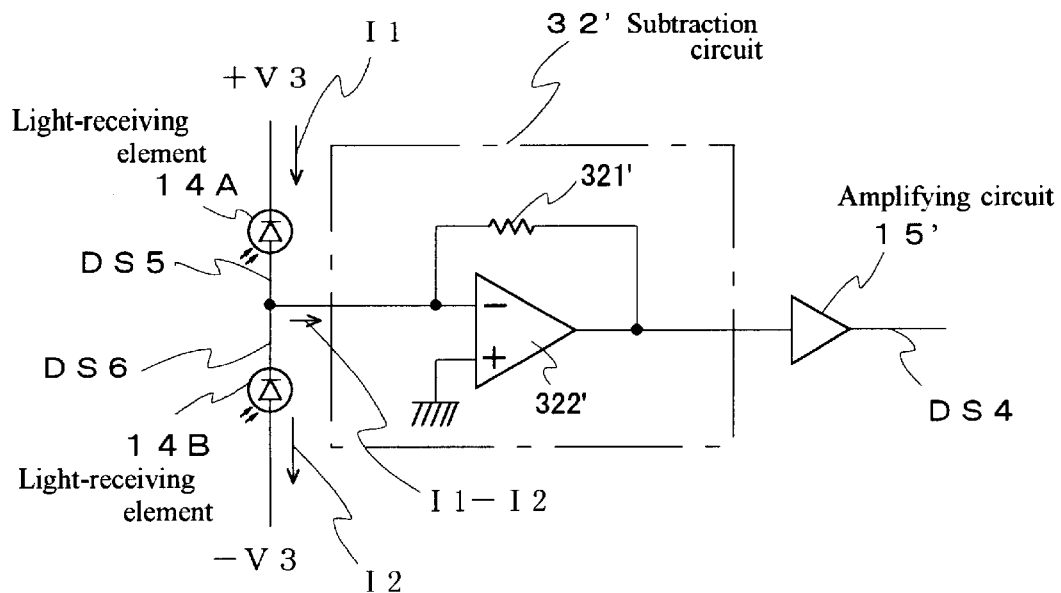

FIG. 13(b) shows an example in which a subtraction circuit 32' is replaced for the circuit in FIG. 13 (a) consisting of the subtraction circuit 32 (consisting of the amplifier 322 and the resistor 321). The as subtraction circuit 32' consists of an arithmetic device 322' and a resistor 321' and the amplifying circuit 15'. The other components in FIG. 13(b) are the same as in FIG. 13(a).

An inverted input terminal of the arithmetic device 322' is connected to each of the anode of the light-receiving element (a photodiode) 14A, the cathode of the light-receiving element (a photodiode) 14B, and one end of the resistor 321'. A non-inverted input terminal is grounded. The other end of the resistor 321' is connected to an output terminal of the arithmetic device 322'. The output signal from the arithmetic device 322' is the fourth digital signal (DS4).

Thus, the current (I1–I2) for the difference between the output current I1 (the electric signal (DS5)) from the light-receiving element 14A and the output current I2 (the electric signal (DS6)) from the light-receiving element 14B flows to the resistor 321' and is output from the arithmetic device 322' as a voltage signal obtained by amplifying the difference current signal (the fourth digital signal (DS4)).

Figure 14:
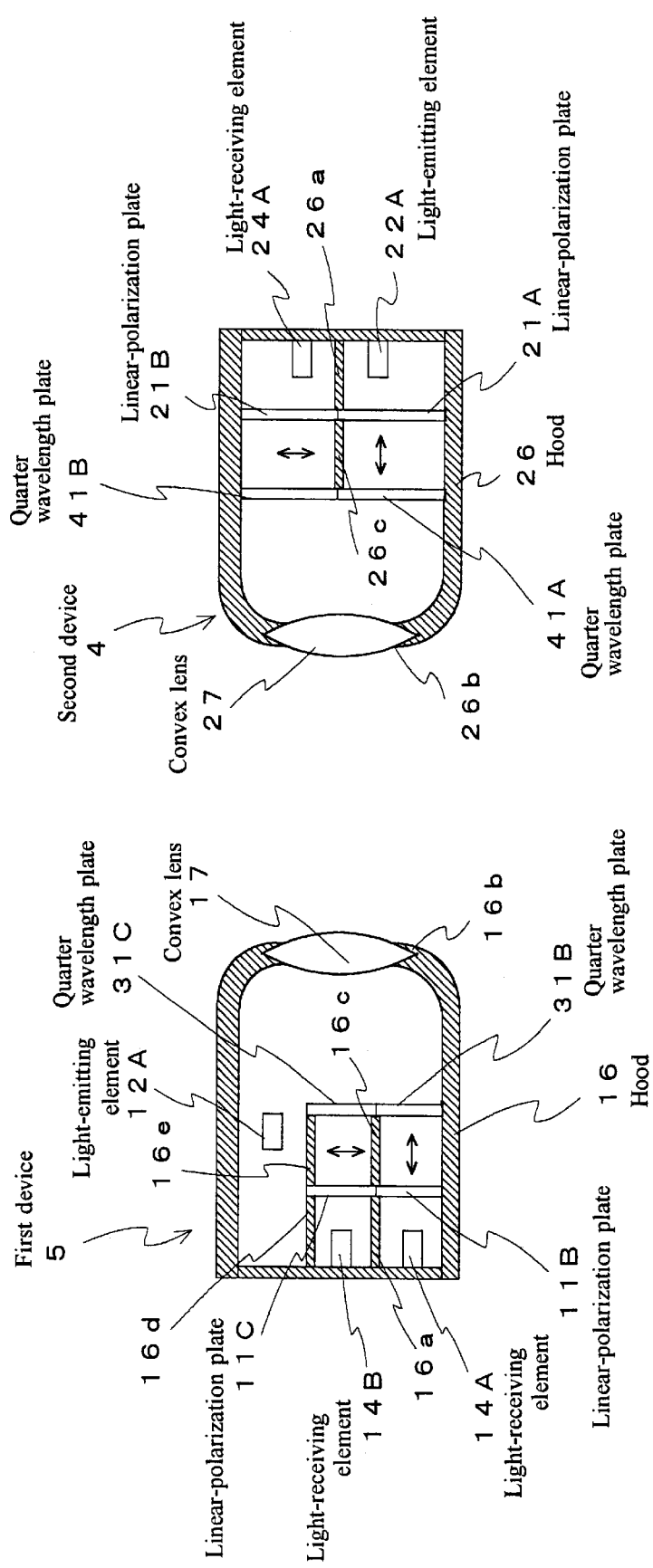
FIG. 14 shows the structure of the integral part of the third embodiment of the present invention.

In addition, in each of the first and second devices 5 and 4, shielding plates 16a, 16c to 16e, 26a, and 26c are provided between the light-emitting elements 12A and 22A and light-receiving elements 14A, 14B, and 24A and the quarter wavelength plates 31A, 31C, 41A, and 41B to separate the paths of the first and second signal lights (Ls1 and Ls2) and incident-light paths to the light-receiving elements 14A and 14B of the first device mutually, as shown in FIG. 14.

FIG. 14 has a spatial margin therein, but of course, the components are actually densely mounted in the apparatus.

According to the bidirectional optical communication apparatus of the above configuration according to the third embodiment, when the first device 5 communicates information to the second device 4, the first digital signal (DS1) to be communicated is input to the light-emitting element 12A via the drive circuit 13 in the transmission section (TX1). Then, light corresponding to the first digital signal (DS1) (the first signal light (Ls1)) is radiated from the light-emitting element 12A to the second device 4 through the external space. The first signal light (Ls1) is not polarized.

The first signal light (Ls1) radiated from the first device 5 reaches the second device 4, where the quarter wavelength plate 41B of the reception section (RX2) converts this light into various linear polarizations. Only the relevant components of the linear polarizations pass through the linear-polarization plate 21B to enter the light-receiving element 24A. The light-receiving element 24A converts the first signal light (Ls1) into an electric signal (a second digital signal (DS2)) and outputs this signal. The second digital signal (DS2) mostly corresponds to the first digital signal (DS1) communicated from the first device 5 to the second device 4.

On the other hand, when the second device 4 communicates information to the first device 5, a third digital signal (DS3) to be communicated is input to the light-emitting element 22A via the drive circuit 23 in the transmission section (TX2), and the light-emitting element 22A emits light based on this signal. Furthermore, the linear-polarization plate 21A converts the light emitted from the light-emitting element 22A into linear polarization, and the quarter wavelength plate 41A converts this polarization into circular one. This circular polarization is radiated through the external space to the first device 5 as the second signal light (Ls2).

The externally radiated second signal light (Ls2) reaches the first device 5, where one 31B of the quarter wavelength plates of the reception section (RX1) converts this light into linear polarization. This linear polarization passes through the linear-polarization plate 11B to enter the light-receiving element 14A. At this point, natural light scattering in the external space is also incident on the quarter wavelength plate 31B, where only the relevant components are converted into linear polarization passing through the linear-polarization plate 11B, which is incident on the light-receiving element 14A. The natural light components scattering in the external space act as noise.

In addition, the second signal light (Ls2) and natural light are incident on the other quarter wavelength plate 31C of the reception section (RX1), which then converts these lights into linear polarization. Only the relevant components of the natural light are converted into linear polarization that can pass through the linear-polarization plate 11C. That is, only the circular polarization components having a rotational direction opposite to that of the second signal light (Ls2) are converted into linear polarization that can pass through the linear-polarization plate 11C. Accordingly, the quarter wavelength plate 31C converts the second signal light (Ls2) into linear polarization that cannot pass through the linear-polarization plate 11C.

Figure 15:
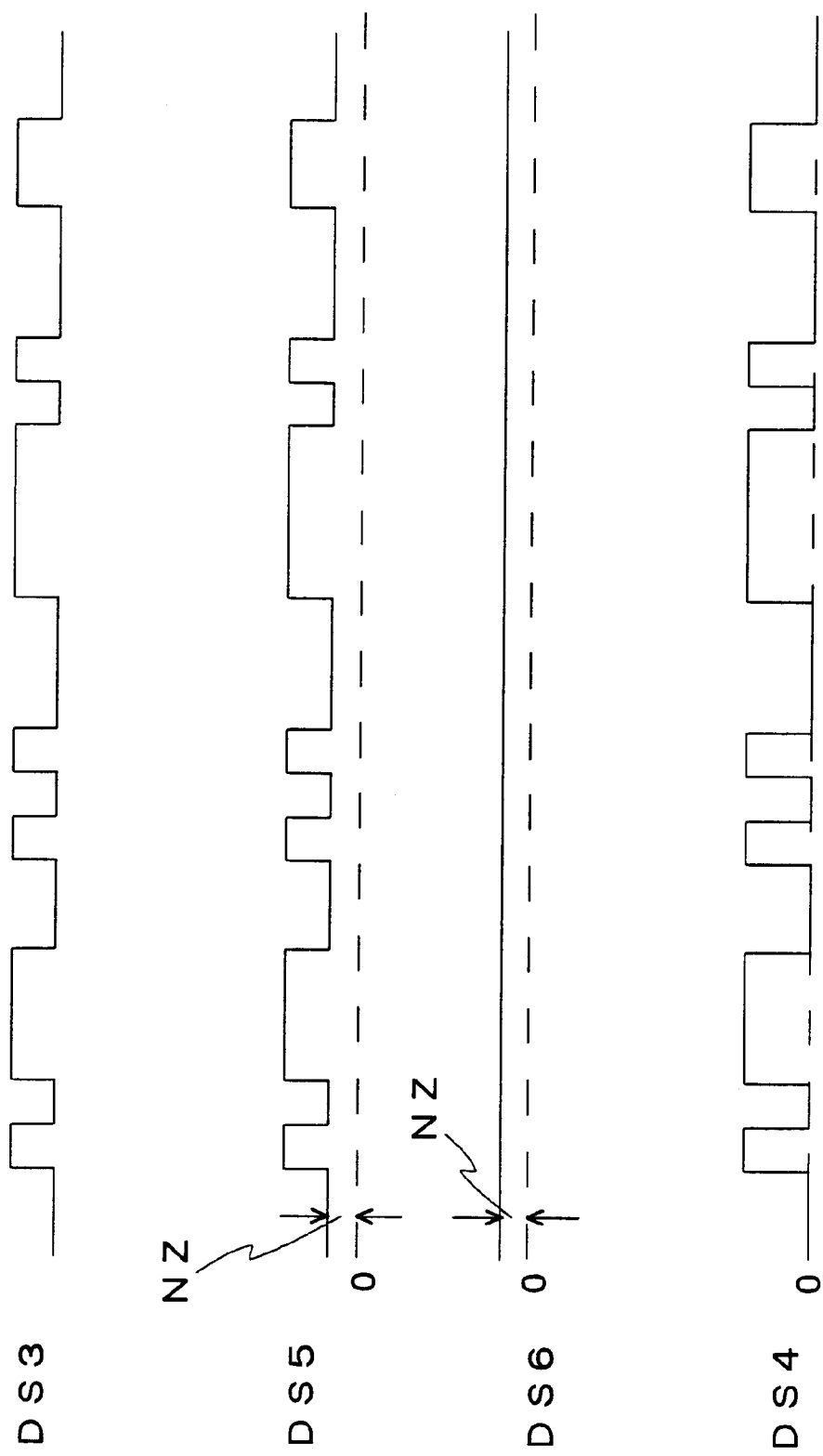
FIG. 15 is a signal waveform diagram describing signal processing according to the third embodiment of the present invention.

Moreover, the two electric signals (DS5 and DS6) output from the light-receiving elements 14A and 14B are input to the subtraction circuit 32. As shown in FIG. 15, the subtraction circuit 32 outputs an electric signal having the level of the difference between these two electric signal levels. The amplifying circuit 15 amplifies this electric signal into the fourth digital signal (DS4).

Then, the subtraction circuit 32 removes those components of the natural light which are commonly present in the output signals from the light-receiving elements 14A and 14B, that is, noise components (NZ). Thus, the electric signal output from the subtraction circuit 32 mostly corresponds to the third digital signal (DS3) communicated from the second device 4 to the first device 5.

If the first signal light (Ls1) radiated to the external space from the transmission section (TX1) of the first device 5 is incident on the reception section (RX1), it equivalently enters the two quarter wavelength plates 31B and 31C. Thus, the subtraction circuit 32 removes this signal light as in the natural light (noise components (NZ)).

Furthermore, since in the reception section (RX2) of the second device 4, the quarter wavelength plate 41B and the linear-polarization plate 21B are provided on the light incidence side of the light-receiving element 24A, the light-receiving element 24A receives only the circular polarization components of the first signal light (Ls1) and natural light incident on the quarter wavelength plate 41B which rotate in the direction opposite to that of the second signal (Ls2). Thus, even if the second signal light (Ls2) emitted from the transmission section (TX2) is incident on the reception section (RX2), it is converted into linear polarization that cannot pass through the linear-polarization plate 21B.

This configuration prevents the reception section (RX1) from changing the first signal light (Ls1) radiated from the transmission section (TX1) of the first device 5, into an electric signal. It also prevents the circular polarization (the second signal light (Ls2)) radiated from the transmission section (TX2) of the second device 4 from being incident on the light-receiving element 24A of the reception section (RX2).

This further precludes each of the reception sections (RX1 and RX2) from receiving a mixture of these two signal lights (Ls1 and Ls2) to prevent malfunction caused by such a mixture. Furthermore, this configuration eliminates the need to improve the light-emitting directionality of the light-emitting elements 12A and 22A and the light incidence directionality of the light-receiving elements 14A, 14B, and 24A to obviate the needs for cumbersome optical-axis alignment. Consequently, data can be communicated using either the half-duplex or full-duplex communication method by simply effectively opposing the first and second devices 5 and 4 to each other, so this configuration is practical. In addition, using the full-duplex communication method, long continuous data transfer can be easily achieved without the needs for complicated protocol control.

Although the third embodiment uses the quarter wavelength plates to convert the second signal light (Ls2) into circular polarization having a different rotational direction while separating the first and second signal lights (Ls1 and Ls2) mutually, almost the same effects can be obtained by using wavelength plates other than the quarter wavelength plates such as one-fifth wavelength plates for the same operations to convert the second signal light (LS2) into elliptic polarization while separating the first and second signal lights (Ls1 and Ls2) mutually.

Next, a fourth embodiment of the present invention will be described.

Figure 16:
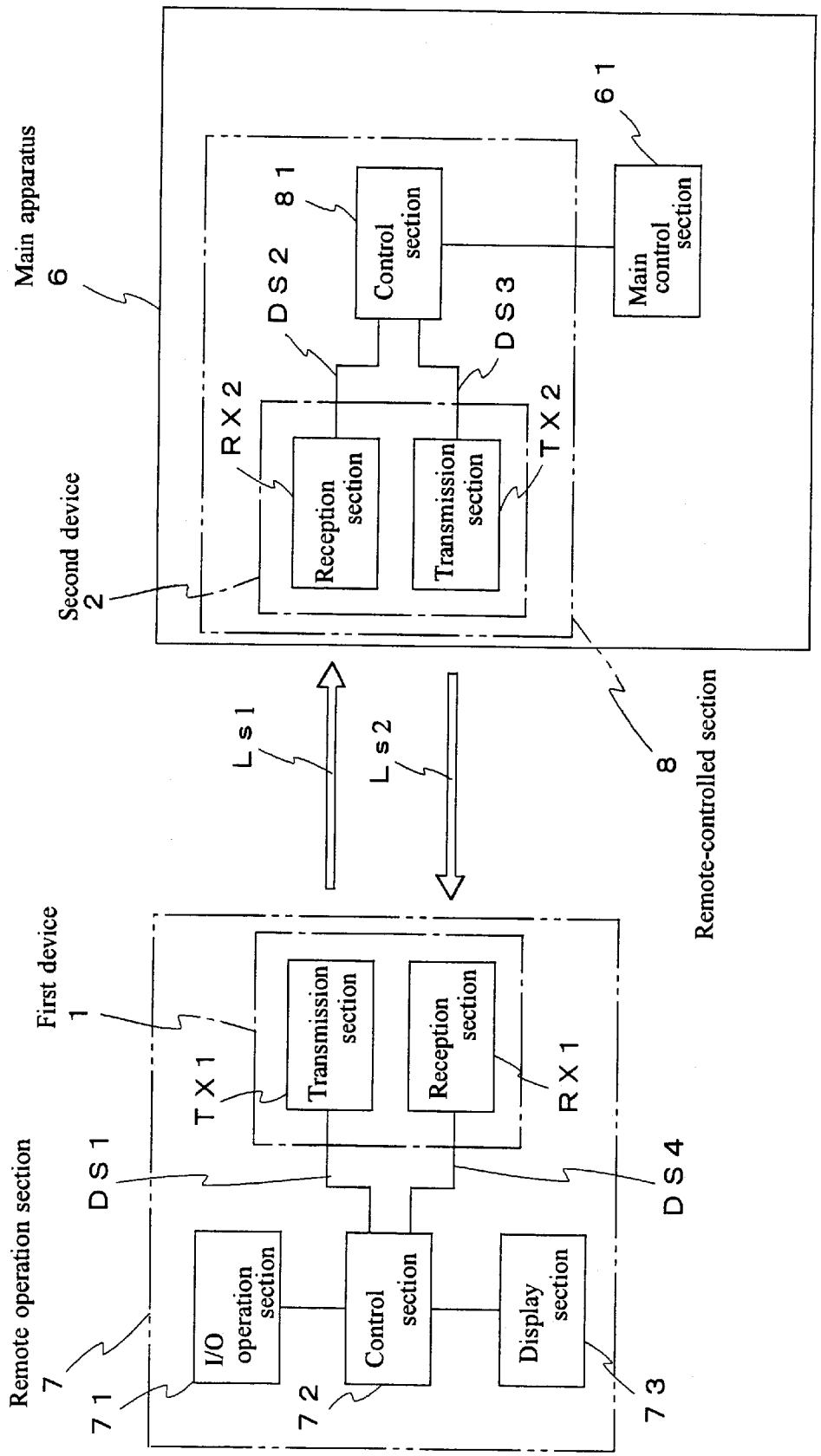
FIG. 16 is a block diagram showing an optical remote control apparatus according to a fourth embodiment of the present invention.

FIG. 16 is a block diagram showing an optical remote control apparatus according to a fourth embodiment of the present invention. This apparatus is configured using the bidirectional optical communication apparatus according to the first embodiment. In the figure, the same components as in the first embodiment have the same reference numerals and their description is omitted.

In addition, this apparatus is composed of a set of a remote operation section 7 located on the operator's side and a remote-controlled section 8 to be remote-controlled that is provided in a main apparatus 6 such as an audio visual apparatus, wherein the remote operation section 7 and the remote-controlled section 8 use light to communicate instructions or information in both directions.

The remote operation section 7 is composed of the first device 1 having the transmission and reception sections (TX1 and RX1); an I/O operation section 71; a control section 72; and a display section 73.

The I/O operation section 71 comprises an instruction input means consisting of, for example, a plurality of momentary switches to output to the control section 72 a switch signal indicating which switch has been pressed by the operator.

The control section 72 is composed of a well-known CPU and a well-known memory and operates based on programs recorded on the memory. Moreover, upon receiving the switch signal from the I/O operation section 71, the control section 72 generates the first digital signal (DS1) corresponding to the instruction assigned to the switch pressed by the operator, and outputs this signal (DS1) to the transmission section (TX1). Then, the transmission section (TX1) radiates the first signal light (Ls1) corresponding to the first digital signal (DS1), through the external space to the remote-controlled section 8.

Furthermore, upon receiving from the reception section (RX1) the fourth digital signal (DS4) originated from the remote-controlled section 8, the control section 72 decodes this signal (DS4) into information and displays this information on the display section 73.

The display section 73 is composed of, for example, a liquid crystal display.

On the other hand, the remote-controlled section 8 is composed of the second device 2 having the transmission section (TX2) and the reception section (RX2); and a control section 81.

The control section 81 is composed of a well-known CPU and a well-known memory and operates based on programs recorded on the memory. Furthermore, upon receiving from the reception section (RX2) the second digital signal (DS2) originated from the remote operation section 7, the control section 81 decodes this signal (DS2) into an instruction and outputs this instruction to a main control section 61 in the main apparatus 6. Based on the instruction sent from the remote operation section 7, the main control section 61 controls the operation of the main apparatus 6.

Moreover, upon receiving from the main control section 61 information to be communicated to the remote operation section 7, the control section 81 generates the third digital signal (DS3) corresponding to this information, and outputs this signal (DS3) to the transmission section (TX2). Then, the transmission section (TX2) radiates to the remote operation section 7 the second signal light (Ls2) corresponding to the third digital signal (DS3).

Figure 17:
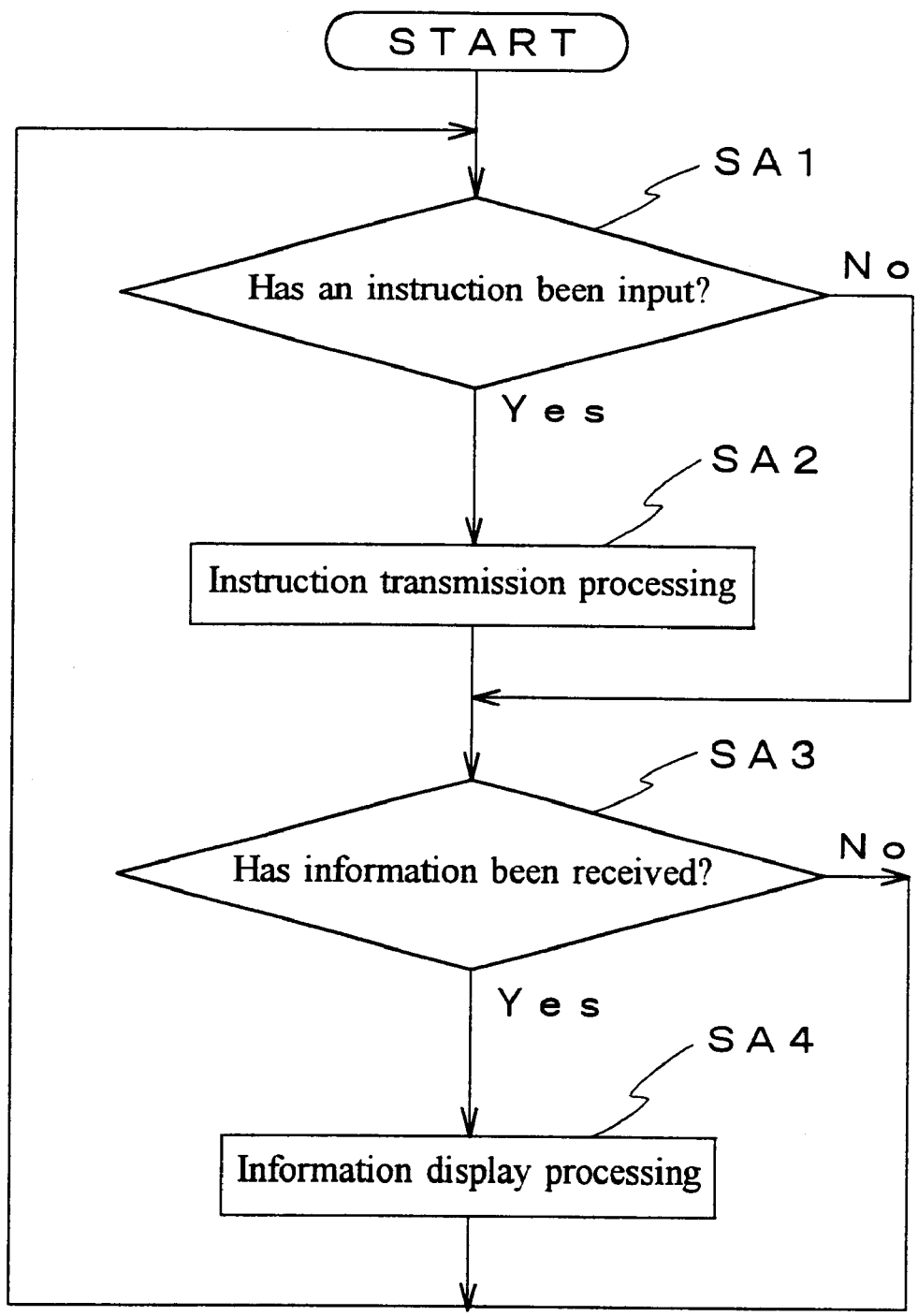
FIG. 17 is a flowchart showing how the operation of a remote operation section is controlled according to the fourth embodiment of the present invention.
Figure 18:
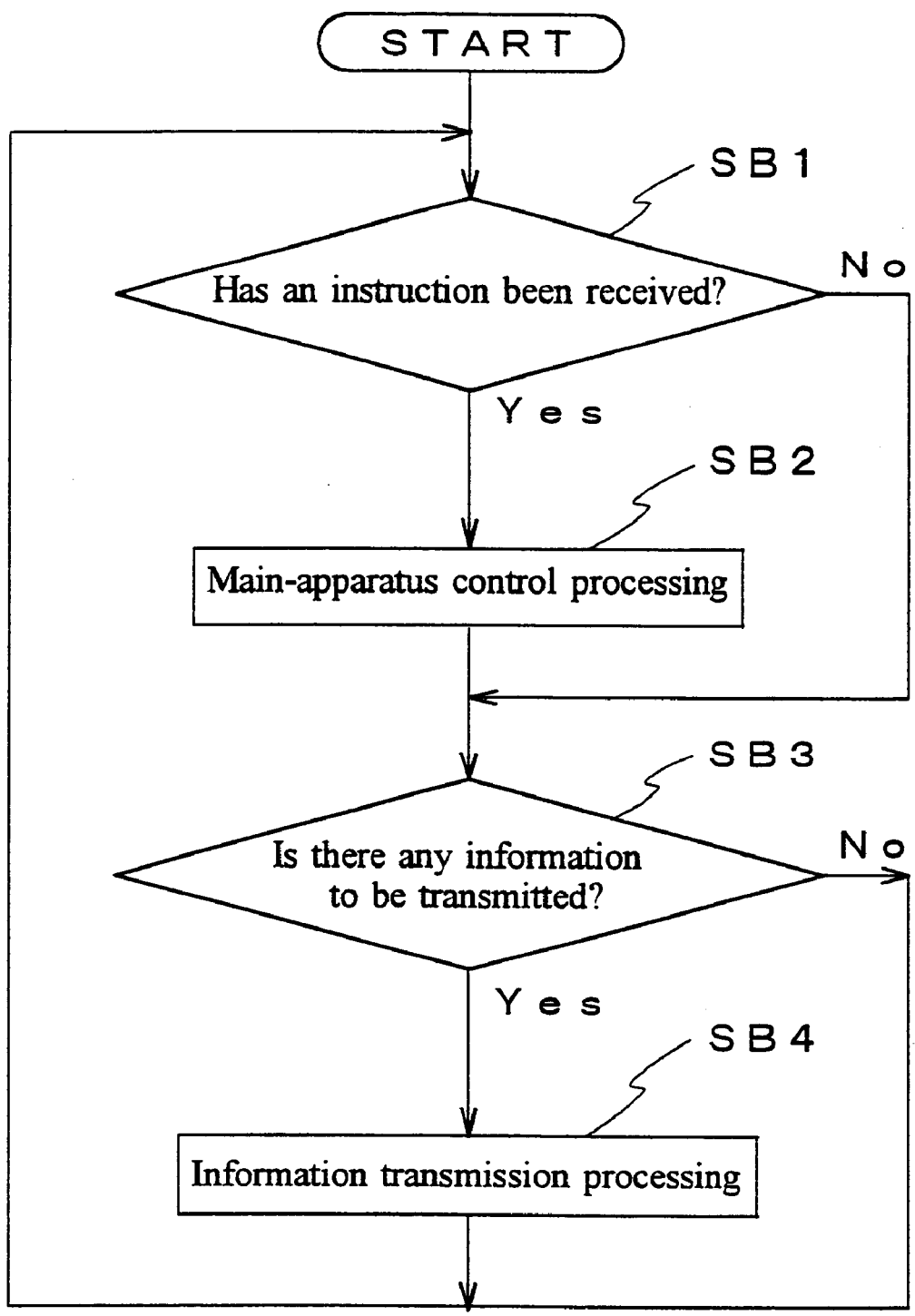
FIG. 18 is a flowchart showing how the operation of a remote-controlled section is controlled according to the fourth embodiment of the present invention.

Next, the operation of the optical remote control apparatus will be described with reference to FIGS. 16 and 17 and the flowchart in FIG. 18.

After starting an operation, the control section 72 of the remote operation section 7 constantly monitors whether any instruction has been received from the I/O operation section 71 and whether information has been received from the remote-controlled section 8 (SA1 and SA3).

When the operator inputs any instruction for the main apparatus 6 via the I/O operation section 71, the control section 72 generates the first digital signal (DS1) corresponding to this instruction and outputs it to the transmission section (TX1) to radiate the first signal light (Ls1) (SA2).

In addition, when the remote-controlled section 8 radiates the second signal light (Ls2) and the reception section (RX1) receives it, the reception section (RX1) inputs the fourth digital signal (DS4) to the control section 72. At this point, the control section 72 decodes the fourth digital signal (DS4) into information and displays this information on the display section 73 (SA4).

On the other hand, after starting an operation, the control section 81 of the remote-controlled section 8 constantly monitors whether any instruction has been received from the remote operation section 7 and whether information to be transmitted to the remote operation section 7 has been received from the main control section 61 (SB1 and SB3).

During this monitoring, upon receiving the first signal light (Ls1) radiated from the remote operation section 7, the reception section (RX2) inputs the second digital signal (DS2) to the control section 81. The control section 81 then decodes the second digital signal (DS2) into an instruction and outputs this instruction to the main control section 61 of the main apparatus 6 to control the operation of the main apparatus 6 (SB2).

In addition, upon receiving from the main control section 61 information to be communicated to the remote operation section 7, the control section 81 generates the third digital signal (DS3) corresponding to this information, and outputs this signal (DS3) to the transmission section (TX2) (SB4). Then, the transmission section (TX2) radiates to the remote operation section 7 the second signal light (Ls2) corresponding to the third digital signal (DS3).

According to the optical remote control apparatus of the above configuration, this optical remote control apparatus is configured using the bidirectional optical communication apparatus described in the first embodiment. Thus, the plane of polarization of linear polarization radiated to the external space from the transmission section (TX1) of the remote operation section 7 is orthogonal to the plane of polarization of linear polarization radiated to the external space from the transmission section (TX2) of the remote-controlled section 8. This configuration precludes the linear polarization radiated from the transmission section (TX1) of the remote operation section 7 from passing through the linear-polarization plate of the reception section (RX1). It also precludes the linear polarization radiated from the transmission section (TX2) of the remote-controlled section 8 from passing through the linear-polarization plate of the reception section (RX2). It thus precludes a mixture of these two signal lights from being received to prevent malfunction resulting from such a mixture.

Moreover, in the remote operation section 7 and the remote-controlled section 8, the light-emitting directionality of the light-emitting elements and the light incidence directionality of the light-receiving elements do not need to be improved. Accordingly, this configuration obviates the needs for cumbersome optical-axis alignment. As a result, data can be communicated using either the half-duplex or full-duplex communication method by simply effectively opposing the remote operation section 7 and the remote-controlled section 8 to each other, so this configuration is practical.

In addition, using the full-duplex communication method, long continuous data transfer can be easily achieved without the needs for complicated protocol control.

Moreover, the information communicated from the main apparatus 6 can be displayed on the display section 73 of the remote operation section 7 located on the operator's side, thereby improving the operability of remote control and enabling information (for example textual information) to be displayed to extend the applicable range of the apparatus.

Next, a fifth embodiment of the present invention will be described.

Figure 19:
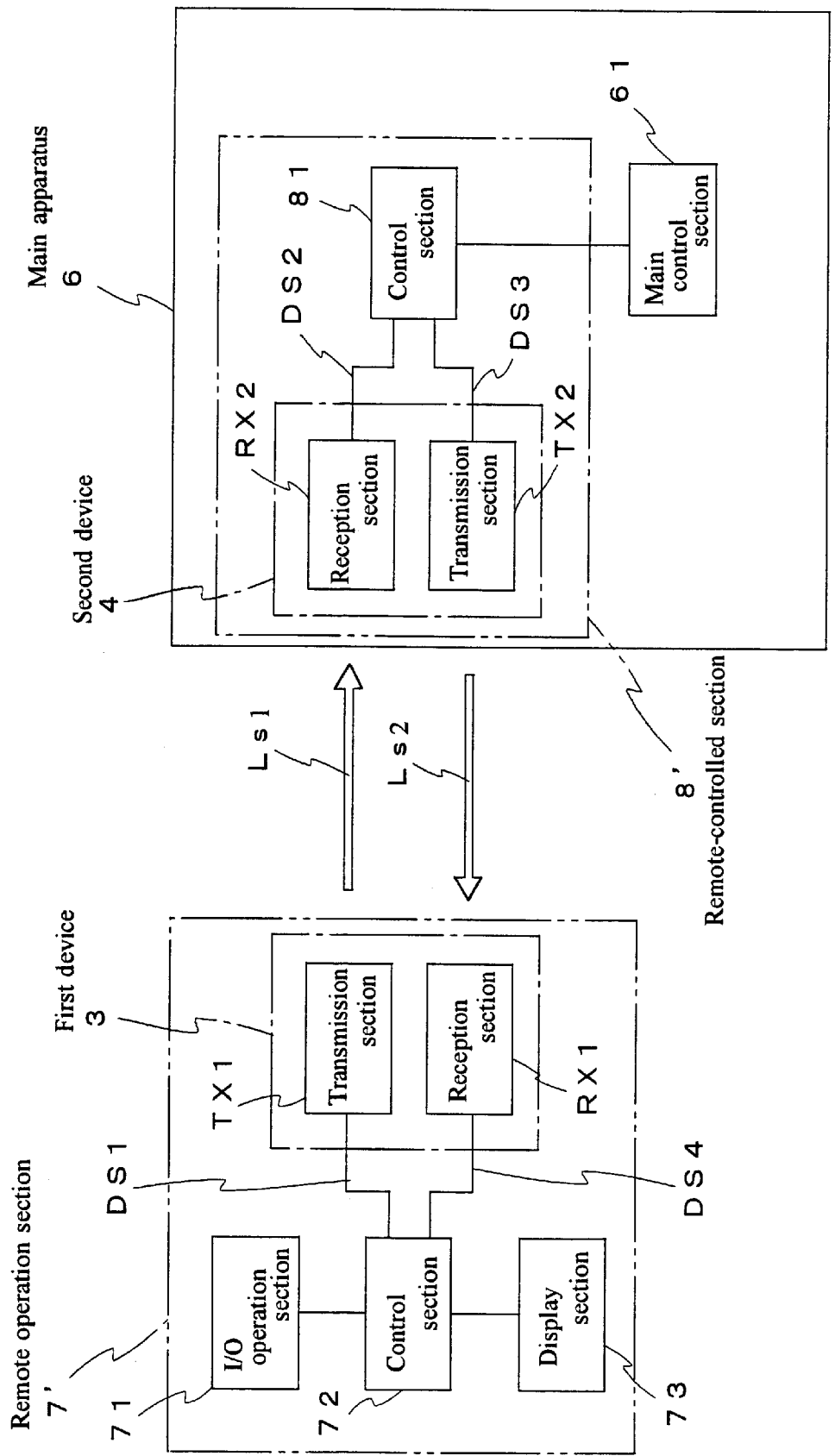
FIG. 19 is a block diagram showing an optical remote control apparatus according to a fifth embodiment of the present invention.

FIG. 19 is a block diagram showing an optical remote control apparatus according to a fifth embodiment of the present invention. This apparatus is configured using the bidirectional optical communication apparatus according to the second embodiment instead of the first and second devices 1 and 2 according to the fourth embodiment. In this figure, the same components as in the second and fourth embodiments have the same reference numerals and their description is omitted.

That is, as shown in FIG. 19, a remote operation section 7' is composed of the first device 3, the I/O operation section 71, the control section 72, and the display section 73, and a remote-controlled section 8' is composed of the second device 4 and the control section 81.

According to the optical remote control apparatus of this configuration, this optical remote control apparatus is configured using the bidirectional optical communication apparatus described in the second embodiment, so the rotational direction of circular polarization radiated to the external space from the transmission section (TX1) of the remote operation section 7' is opposite to the rotational direction of circular polarization radiated to the external space from the transmission section (TX2) of the remote-controlled section 8'. This configuration prevents the circular polarization radiated from the transmission section (TX1) from being incident on the light-receiving element of the reception section (RX1) while preventing the circular polarization radiated from the transmission section (TX2) from being incident on the light-receiving element of the reception section (RX2). It thus precludes a mixture of these two signal lights frombeing received to prevent malfunction resulting from such a mixture.

This configuration also eliminates the need to improve the light-emitting directionality of the light-emitting elements and the light incidence directionality of the light-receiving elements in the remote operation section 7' and the remote-controlled section 8'. Accordingly, it obviates the needs for cumbersome optical-axis alignment. As a result, data can be communicated using either the half-duplex or full-duplex communication method by simply effectively opposing the remote operation section 7' and the remote-controlled section 8' to each other, so this configuration is practical.

In addition, using the full-duplex communication method, long continuous data transfer can be easily achieved without the needs for complicated protocol control.

Moreover, the information communicated from the main apparatus 6 can be displayed on the display section 73 of the remote operation section 7' located on the operator's side, thereby improving the operability of remote control and enabling textual information to be displayed to extend the applicable range of the apparatus.

Next, a sixth embodiment of the present invention will be described.

Figure 20:
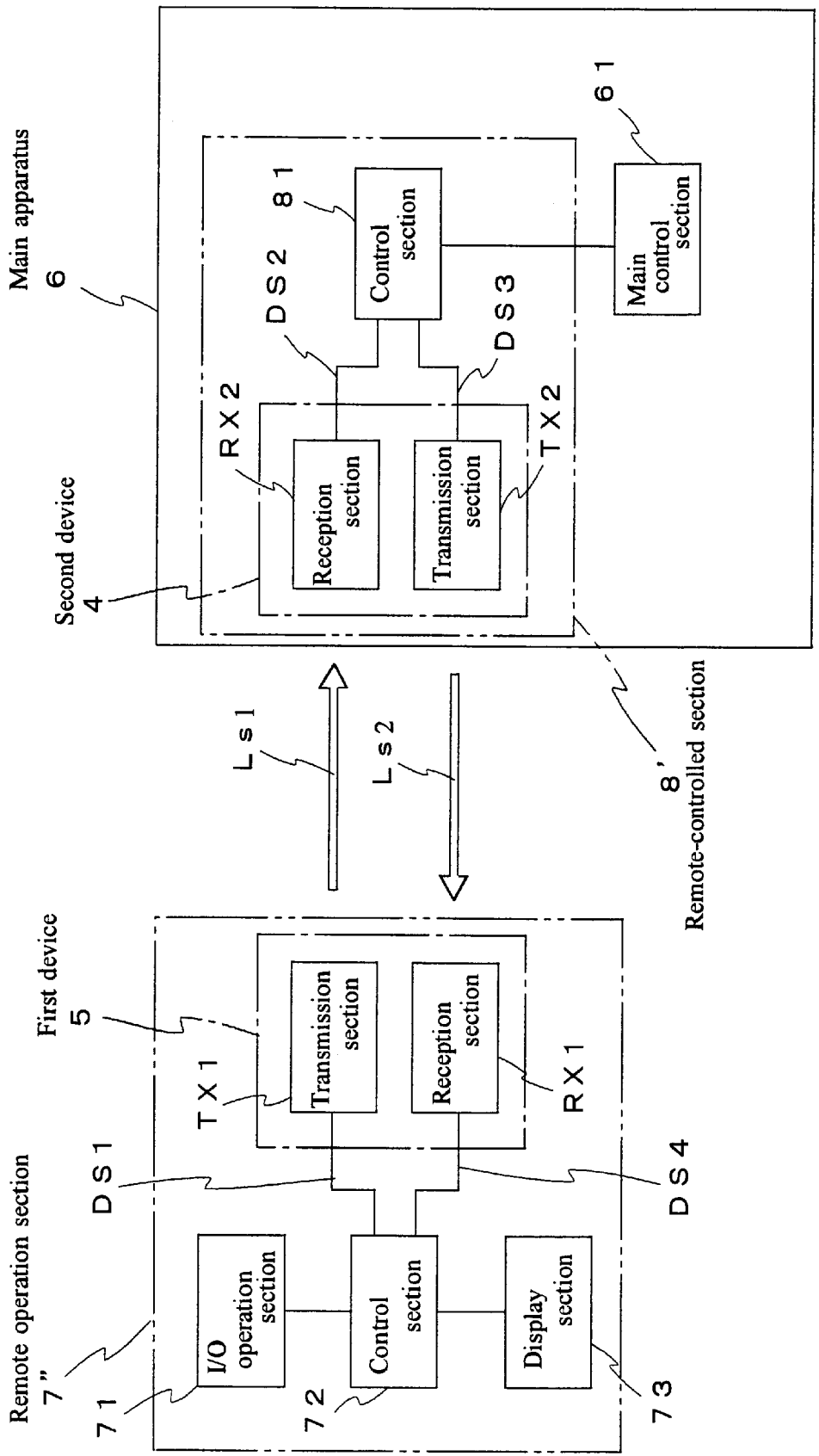
FIG. 20 is a block diagram showing an optical remote control apparatus according to a sixth embodiment of the present invention.

FIG. 20 is a block diagram showing an optical remote control apparatus according to the sixth embodiment of the present invention. This apparatus is configured using the bidirectional optical communication apparatus according to the third embodiment instead of the first and second devices 1 and 2 according to the fourth embodiment. In this figure, the same components as in the third and fourth embodiments have the same reference numerals and their description is omitted.

As shown in FIG. 20, a remote operation section 7" is composed of the first device 5, the I/O operation section 71, the control section 72, and the display section 73, and the remote-controlled section 8' is composed of the second device 4 and the control section 81.

According to the optical remote control apparatus of this configuration, this optical remote control apparatus is configured using the bidirectional optical communication apparatus described in the third embodiment. Thus, this apparatus prevents the reception section (RX1) from changing light radiated from the transmission section (TX1) of the remote operation section 7", into an electric signal. It also prevents circular polarization radiated from the transmission section (TX2) of the remote-controlled section 8' from being incident on the light-receiving element of the reception section (RX2). It thus precludes a mixture of these two signal lights from being received to prevent malfunction resulting from such a mixture.

This configuration also obviates the need to improve the light-emitting directionality of the light-emitting element or the light incidence directionality of the light-receiving element in the remote operation section 7" and the remote-controlled section 8' to eliminate the needs for cumbersome optical-axis alignment. Consequently, data can be communicated using either the half-duplex or full-duplex communication method by simply effectively opposing the remote operation section 7" and the remote-controlled section 8' to each other, so this configuration is practical.

In addition, using the full-duplex communication method, long continuous data transfer can be easily achieved without the needs for complicated protocol control.

Moreover, the information communicated from the main apparatus 6 can be displayed on the display section 73 of the remote operation section 7" located on the operator's side, thereby improving the operability of remote control and enabling textual information to be displayed to extend the applicable range of the apparatus.

Although the fifth and sixth embodiments use the quarter wavelength plates to allow circular polarizations to be used as the signal lights, the present invention is not limited to this aspect. Almost the same effects can be obtained by, for example, using wavelength plates other than the quarter wavelength plates such as one-fifth wavelength plates and using elliptic polarizations as the signal lights to separate the first and second signal lights (Ls1 and Ls2).

In addition, although the sixth embodiment uses the first device 5 in the remote operation section 7" while using the second device 4 in the remote-controlled section 8', the second device 4 may be used in the remote operation section 7" while the first device 5 may be used in the remote-controlled section 8'.

What is claimed is:

1. A bidirectional optical communication apparatus comprising a set of a first device and a second device that use light to communicate information in both directions, said first device comprising a first transmission section and a first reception section, said first transmission section comprising first light-emitting means for emitting light corresponding to a transmitted digital signal, and a first linear-polarization plate located on the light emission side of the first light-emitting means, said first reception section comprising first light-receiving means, and a second linear-polarization plate provided on the light incidence side of the first light-receiving means and located in such as way as to pass linear polarization having a plane of polarization orthogonal to the plane of polarization of linear polarization passing through said first linear-polarization plate, said second device comprising a second transmission section and a second reception section, said second transmission section comprising second light-emitting means for emitting light corresponding to a transmitted digital signal, and a third linear-polarization plate located on the light emission side of the second light-emitting means to pass linear polarization having the polarization surface of linear polarization passing through said second linear-polarization plate, said second reception section comprising second light-receiving means, and a fourth linear-polarization plate provided on the light incidence side of the second light-receiving means and located in such as way as to pass linear polarization having the same polarization surface as linear polarization passing through said first linear-polarization plate.

2. A bidirectional optical communication apparatus comprising a set of a first device and a second device that use light to communicate information in both directions, said first device comprising a first transmission section and a first reception section, said first transmission section comprising first light-emitting means for emitting light corresponding to a transmitted digital signal, a first linear-polarization plate located on the light emission side of the first light-emitting means, and a first wavelength plate on which linear polarization emitted from the first linear-polarization plate is incident to emit circular or elliptic polarization in one of the rotational directions, said first reception section comprising first light-receiving means, and a second wavelength plate provided on the light incidence side of the first light-receiving means and on which circular or elliptic polarization in the other rotational direction is incident to emit linear polarization, and a second linear-polarization plate provided between said first light-receiving means and said second wavelength plate to pass linear polarization emitted from said second wavelength plate to allow it to enter said first light-receiving means, said second device comprising a second transmission section and a second reception section, said second transmission section comprising second light-emitting means for emitting light corresponding to a transmitted digital signal, a third linear-polarization plate located on the light emission side of the second light-emitting means, and a third wavelength plate on which linear polarization emitted from the third linear-polarization plate is incident to emit circular or elliptic polarization in said other rotational direction, said second reception section comprising second light-receiving means, a fourth linear-polarization plate provided on the light incidence side of the second light-receiving means, and a fourth wavelength plate located on the light incidence side of the fourth linear-polarization plate and on which circular or elliptic polarization emitted from said first wavelength plate is incident to emit linear polarization passing through said fourth linear-polarization plate.

3. A bidirectional optical communication apparatus comprising a set of a first device and a second device that use light to communicate information in both directions, said first device comprising a first transmission section and a first reception section, said first transmission section comprising first light-emitting means for emitting light corresponding to a transmitted digital signal, said first reception section comprising first and second light-receiving means, a first linear-polarization plate provided on the light incidence side of the first light-receiving means, a second linear-polarization plate provided on the light incidence side of said second light-receiving means, a first wavelength plate located on the light incidence side of said first linear-polarization plate and on which circular or elliptic polarization in one of the rotational directions is incident to emit linear polarization passing through said first linear-polarization plate, and a second wavelength plate located on the light incidence side of said second linear-polarization plate and on which circular or elliptic polarization in the other rotational direction is incident to emit linear polarization passing through said second linear-polarization plate, and a subtraction circuit for receiving electric signals output from said first and second light-receiving means to output the difference between the electric signal levels, said second device comprising a second transmission section and a second reception section, said second transmission section comprising second light-emitting means for emitting light corresponding to a transmitted digital signal, a third linear-polarization plate located on the light emission side of the second light-emitting means, and a third wavelength plate on which linear polarization emitted from the third linear-polarization plate is incident to emit circular or elliptic polarization in said one of the rotational directions, said second reception section comprising a third light-receiving means, a fourth linear-polarization plate provided on the light incidence side of the third light-receiving means, and a fourth wavelength plate located on the light incidence side of the fourth linear-polarization plate and on which circular or elliptic polarization in said other rotational direction is incident to emit linear polarization passing through said fourth linear-polarization plate.

4. A bidirectional optical communication apparatus according to claim 1, wherein said first and second light-emitting means emit infrared rays, and wherein said first and second light-receiving means receive infrared rays to convert them into electric signals.

5. A bidirectional optical communication apparatus according to claim 2, wherein quarter wavelength plates are used as said first to fourth wavelength plates.

6. An optical remote control apparatus comprising a set of a remote operation section located on the operator's side and a remote-controlled section provided in a main apparatus which is to be remote-controlled, the remote operation section and the remote-controlled section using light to communicate instructions or information in both directions, said remote operation section comprising a first transmission section, a first reception section, an I/O operation section, a first control section, and a display section, said first transmission section comprising first light-emitting means for receiving a transmitted digital signal from said first control section to emit light corresponding to the digital signal, and a first linear-polarization plate located on the light emission side of the first light-emitting means, said first reception section comprising first light-receiving means, a second linear-polarization plate provided on the light incidence side of the first light-receiving means to pass linear polarization having a plane of polarization orthogonal to the plane of polarization of linear polarization passing through said first linear-polarization plate, said I/O operation section comprising instruction input means for allowing the operator to input control instructions, said first control section comprising transmit signal generation means for generating a digital signal corresponding to an instruction input using said instruction input means to output it to said first transmission section as said transmitted digital signal, information decoding means for decoding an electric signal output by said first reception section, into the receive information, and display control means for displaying on said display section the information decoded by the information decoding means, said remote-controlled section comprising a second transmission section, a second reception section, and a second control section, said second transmission section comprising second light-emitting means for emitting light corresponding to a transmitted digital signal, and a third linear-polarization plate located on the light emission side of the second light-emitting means to pass linear polarization having the polarization surface of linear polarization passing through said second linear-polarization plate, said second reception section comprising second light-receiving means, and a fourth linear-polarization plate provided on the light incidence side of the second light-receiving means to pass linear polarization having the same polarization surface as linear polarization passing through said first linear-polarization plate, said second control section comprising transmit signal generation means for generating a digital signal corresponding to information communicated to said remote operation section to output it to said second transmission section as said transmitted digital signal, instruction decoding means for decoding an electric signal output by said second reception section, into the control instruction, and operation control means for controlling the operation of said main apparatus based on the control instruction decoded by the instruction decoding means.

7. An optical remote control apparatus comprising a set of a remote operation section located on the operator's side and a remote-controlled section provided in a main apparatus which is to be remote-controlled, the remote operation section and the remote-controlled section using light to communicate instructions or information in both directions, said remote operation section comprising a first transmission section, a first reception section, an I/O operation section, a first control section, and a display section, said first transmission section comprising first light-emitting means for receiving a transmitted digital signal from said first control section to emit light corresponding to the digital signal, a first linear-polarization plate located on the light emission side of the first light-emitting means, and a first wavelength plate on which linear polarization emitted from the first linear-polarization plate is incident to emit circular or elliptic polarization in one of the rotational directions, said first reception section comprising first light-receiving means, a second wavelength plate provided on the light incidence side of the first light-receiving means and on which circular or elliptic polarization in the other rotational direction is incident to emit linear polarization, and a second linear-polarization plate provided between said first light-receiving means and said second wavelength plate to pass linear polarization emitted from said second wavelength plate to allow it to enter said first light-receiving means, said I/O operation section comprising instruction input means for allowing the operator to input control instructions, said first control section comprising transmit signal generation means for generating a digital signal corresponding to an instruction input using said instruction input means to output it to said first transmission section as said transmitted digital signal, information decoding means for decoding an electric signal output by said first reception section, into the receive information, and display control means for displaying on said display section the information decoded by the information decoding means, said remote-controlled section comprising a second transmission section, a second reception section, and a second control section, said second transmission section comprising second light-emitting means for emitting light corresponding to a transmitted digital signal, a third linear-polarization plate located on the light emission side of the second light-emitting means, and a third wavelength plate on which linear polarization emitted from the third linear-polarization plate is incident to emit circular or elliptic polarization in said other rotational direction, said second reception section comprising second light-receiving means, a fourth linear-polarization plate provided on the light incidence side of the second light-receiving means, and a fourth wavelength plate located on the light incidence side of the fourth linear-polarization plate and on which circular or elliptic polarization emitted from said first wavelength plate is incident to emit linear polarization passing through said fourth linear-polarization plate, said second control section comprising transmit signal generation means for generating a digital signal corresponding to information communicated to said remote operation section to output it to said second transmission section as said transmitted digital signal, instruction decoding means for decoding an electric signal output by said second reception section, into the control instruction, and operation control means for controlling the operation of said main apparatus based on the control instruction decoded by the instruction decoding means.

8. An optical remote control apparatus comprising a set of a remote operation section located on the operator's side and a remote-controlled section provided in a main apparatus which is to be remote-controlled, the remote operation section and the remote-controlled section using light to communicate instructions or information in both directions, said remote operation section comprising a first transmission section, a first reception section, an I/O operation section, a first control section, and a display section, said first transmission section comprising first light-emitting means for emitting light corresponding to a transmitted digital signal, said first reception section comprising first and second light-receiving means, a first linear-polarization plate located on the light incidence side of the first light-receiving means, a second linear-polarization plate located on the light incidence side of said second light-receiving means, a first wavelength plate located on the light incidence side of said first linear-polarization plate and on which circular or elliptic polarization in one of the rotational directions is incident to emit linear polarization passing through said first linear-polarization plate, a second wavelength plate located on the light incidence side of said second linear-polarization plate and on which circular or elliptic polarization in the other rotational direction is incident to emit linear polarization passing through said second linear-polarization plate, and a subtraction circuit that receives electric signals output from said first and second light-receiving means to output the difference in the electric signal levels, said I/O operation section comprising instruction input means for allowing the operator to input control instructions, said first control section comprising transmit signal generation means for generating a digital signal corresponding to an instruction input using said instruction input means to output it to said first transmission section as said transmitted digital signal, information decoding means for decoding an electric signal output by the subtraction circuit in said first reception section, into the receive information, and display control means for displaying on said display section the information decoded by the information decoding means, said remote-controlled section comprising a second transmission section, a second reception section, and a second control section, said second transmission section comprising second light-emitting means for emitting light corresponding to a transmitted digital signal, a third linear-polarization plate located on the light emission side of the second light-emitting means, and a third wavelength plate on which linear polarization emitted from the third linear-polarization plate is incident to emit circular or elliptic polarization in said one of the rotational directions, said second reception section comprising third light-receiving means, a fourth linear-polarization plate provided on the light incidence side of the third light-receiving means, and a fourth wavelength plate located on the light incidence side of the fourth linear-polarization plate and on which circular or elliptic polarization in said other rotational direction is incident to emit linear polarization passing through said fourth linear-polarization plate, said second control section comprising transmit signal generation means for generating a digital signal corresponding to information communicated to said remote operation section to output it to said second transmission section as said transmitted digital signal, instruction decoding means for decoding an electric signal output by said second reception section, into the control instruction, and operation control means for controlling the operation of said main apparatus based on the control instruction decoded by the instruction decoding means.

9. An optical remote control apparatus according to claim 6, wherein said first and second light-emitting means emit infrared rays, and wherein said first and second light-receiving means receive infrared rays to convert them into electric signals.

10. An optical remote control apparatus according to claim 7 wherein quarter wavelength plates are used as said first to fourth wavelength plates.

* * * * *